(12) United States Patent
Panzarella et al.

(10) Patent No.: US 6,227,508 B1
(45) Date of Patent: May 8, 2001

(54) ADJUSTABLE SUPPORT APPARATUS

(75) Inventors: Thomas A. Panzarella; David D. McClanahan, both of Harleysville, PA (US)

(73) Assignee: Cook Specialty Company, Green Lane, PA (US)

( * ) Notice: Subject to any disclaimer, the term of this patent is extended or adjusted under 35 U.S.C. 154(b) by 0 days.

(21) Appl. No.: 09/248,403

(22) Filed: Feb. 12, 1999

(51) Int. Cl.$^7$ .................................................. E04G 3/00
(52) U.S. Cl. .................................. 248/276.1; 248/118.3; 248/918
(58) Field of Search ................................. 248/118, 118.1, 248/118.3, 918, 312, 276.1, 980.11

(56) References Cited

U.S. PATENT DOCUMENTS

| | | | |
|---|---|---|---|
| 3,744,891 | 7/1973 | Dennis et al. | 353/27 |
| 4,496,200 | 1/1985 | Hagstrom et al. | 312/208 |
| 4,625,657 | 12/1986 | Little et al. | 108/93 |
| 4,644,875 | 2/1987 | Watt | 108/93 |
| 4,706,919 | 11/1987 | Soberalski et al. | 248/281.1 |
| 4,768,744 | * 9/1988 | Leeds et al. | 248/280.1 |
| 4,836,486 | * 6/1989 | Vossoughi et al. | 248/281.1 |
| 5,037,054 | 8/1991 | McConnell | 248/284 |
| 5,098,053 | 3/1992 | Cotterill | 248/281.1 |
| 5,226,867 | 7/1993 | Beal | 482/127 |
| 5,235,725 | 8/1993 | Rees | 16/298 |
| 5,277,604 | 1/1994 | Ida et al. | 439/164 |
| 5,348,260 | * 9/1994 | Acevedo | 248/280.1 |
| 5,377,951 | 1/1995 | Johnson et al. | 248/639 |
| 5,390,904 | 2/1995 | Rivard et al. | 267/204 |
| 5,513,469 | 5/1996 | Tajudeen et al. | 49/404 |
| 5,593,265 | 1/1997 | Kizer | 411/552 |
| 5,609,316 | * 3/1997 | Tigliev | 248/123.11 |
| 5,652,985 | 8/1997 | Wilkinson et al. | 5/710 |
| 5,661,927 | 9/1997 | Polowinczak et al. | 49/447 |
| 5,683,064 | 11/1997 | Copeland et al. | 248/278.1 |
| 5,697,303 | 12/1997 | Allan | 108/93 |
| 5,707,034 | 1/1998 | Cotterill | 248/284.1 |
| 5,758,208 | 5/1998 | Fujii et al. | 396/87 |
| 5,765,797 | 6/1998 | Greene et al. | 248/398 |
| 5,778,799 | 7/1998 | Eyre | 108/7 |
| 5,791,263 | 8/1998 | Watt et al. | 108/138 |
| 5,823,487 | 10/1998 | Kirchhoff et al. | 248/118 |
| 5,857,415 | 1/1999 | Richard | 108/50.01 |
| 5,859,656 | 1/1999 | Aragon et al. | 347/218 |

OTHER PUBLICATIONS

"Negative Spring: New Tool for Engineers", *Business Week*, Jul. 2, 1949, 40–42.

AMETEK Hunter Spring Products, "Stock and custom–designed spring–powered devices for the design engineer", Bulletin FS–202, 1995, 12 pages.

(List continued on next page.)

Primary Examiner—Leslie A. Braun
Assistant Examiner—Walter Landry
(74) Attorney, Agent, or Firm—Woodcock Washburn Kurtz Mackiewicz & Norris LLP

(57) ABSTRACT

An adjustable support apparatus for supporting an object, such as a keyboard. The apparatus has a rotatable arm to which a rotatable support plate is attached. Rotation of the arm allows the height of the support plate to be adjusted. Rotation of the support plate allows its inclination to be adjusted. A constant force spring applies a varying upward moment to the support arm that approximates the varying downward weight moment applied to support arm, thereby restraining downward motion of the arm and making it easier for the user to raise the arm. Ratchet and pawl mechanisms lock the angular orientation of the support arm and the inclination of the support plate. The support plate is pivoted to the support arm so that twisting of the support plate disengages both the height and the inclination locking mechanisms.

54 Claims, 16 Drawing Sheets

OTHER PUBLICATIONS

Votta, Jr., F.A., "Constant–Force Springs for High Output at Short Deflection", *Machine Design Magazine,* 102–103.

The Neg'ator® Spring . . . , "Two Neg'ators Carry 83% of Sliding–Assembly Weight to Provide Specified Belt Tension on Grinder," "Neg'ators Exert Constant Operating Force Through 26½ of Travel to Simplify Vending Machine," and "The Neg'ator Counterbalances—A Fluorescent Lighting Fixture", 3 pages.

Neg'ators Springs Counterbalance Without Mass, Simplify Linkages, Save Space, "Oven Doors Counterbalanced with Neg'ator Extension Springs," and "Neg'ator Springs Simplify Counterbalancing of RCA Included Amplifier", 1 page.

Neg'ator Constant–Torque Spring Motor and RW Laminar Spring description pages, 2 pages.

The Neg'ator® Sketchbook, Hunter Spring Company, Lansdale, PA, 2 pages.

Mounting Considerations page containing details on "Cavity Mounting," "Multiple Mountings," and "Free End Engagement", 1 page.

Neg'ator® Constant Force Extension Springs Design Procedure, 1 page.

The Neg'ator® Spring, "The Neg'ator Spring Used as a Counterbalance", 1 page.

More Applications, diagrams of Retraction, Door Closer, Printed Tapes, Morot Brush Springs, Tensioning and Loading, and Merchandise Dispenser, 1 page.

AMETEK, information regarding "Neg'ator® Constant Force Extension Springs, The Reel Experts, Air/Fluid Hose Reels, Electrical Cord Reels, Cable Reels, and Stock Reels", Hunter Spring Products, 4 pages.

* cited by examiner

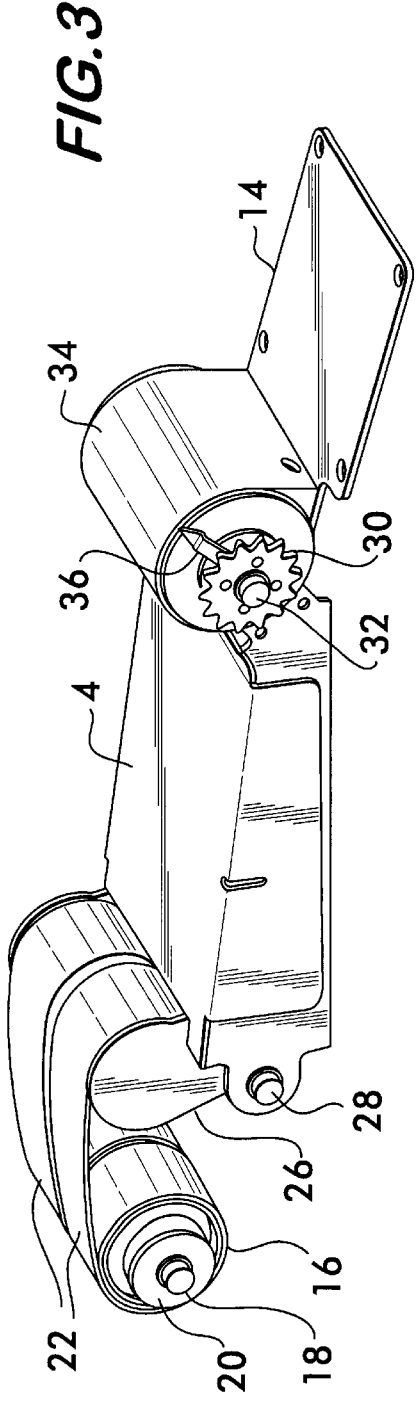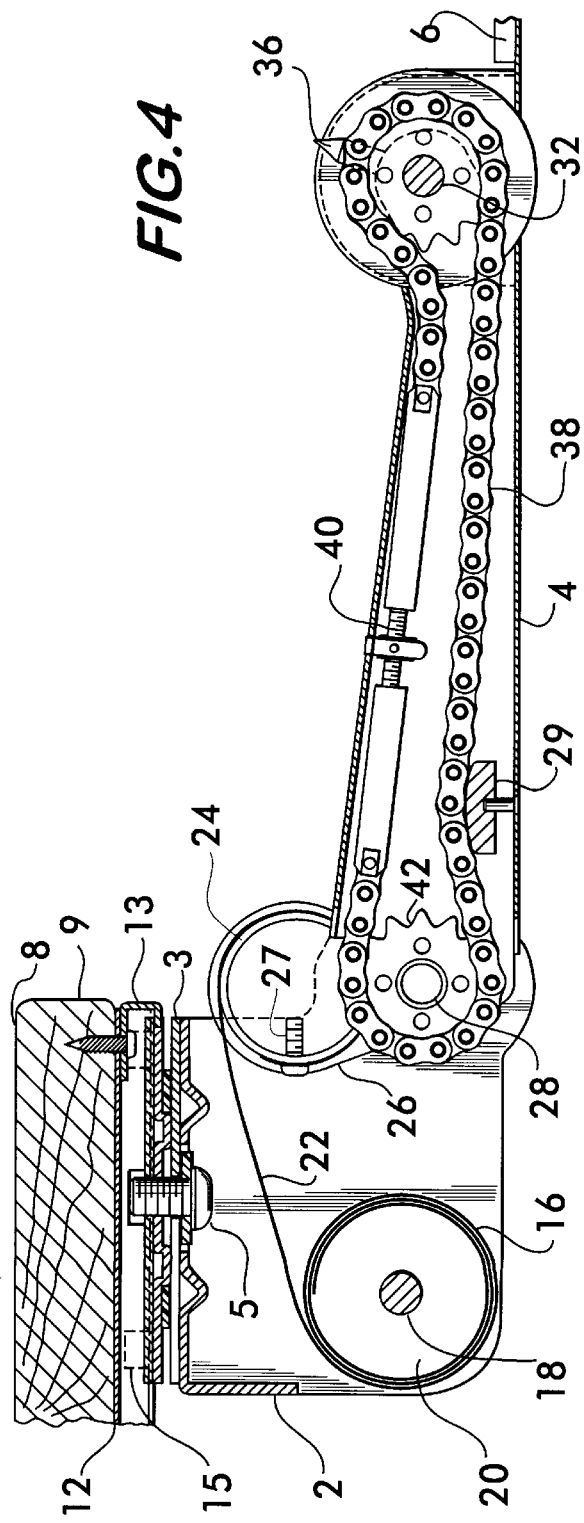

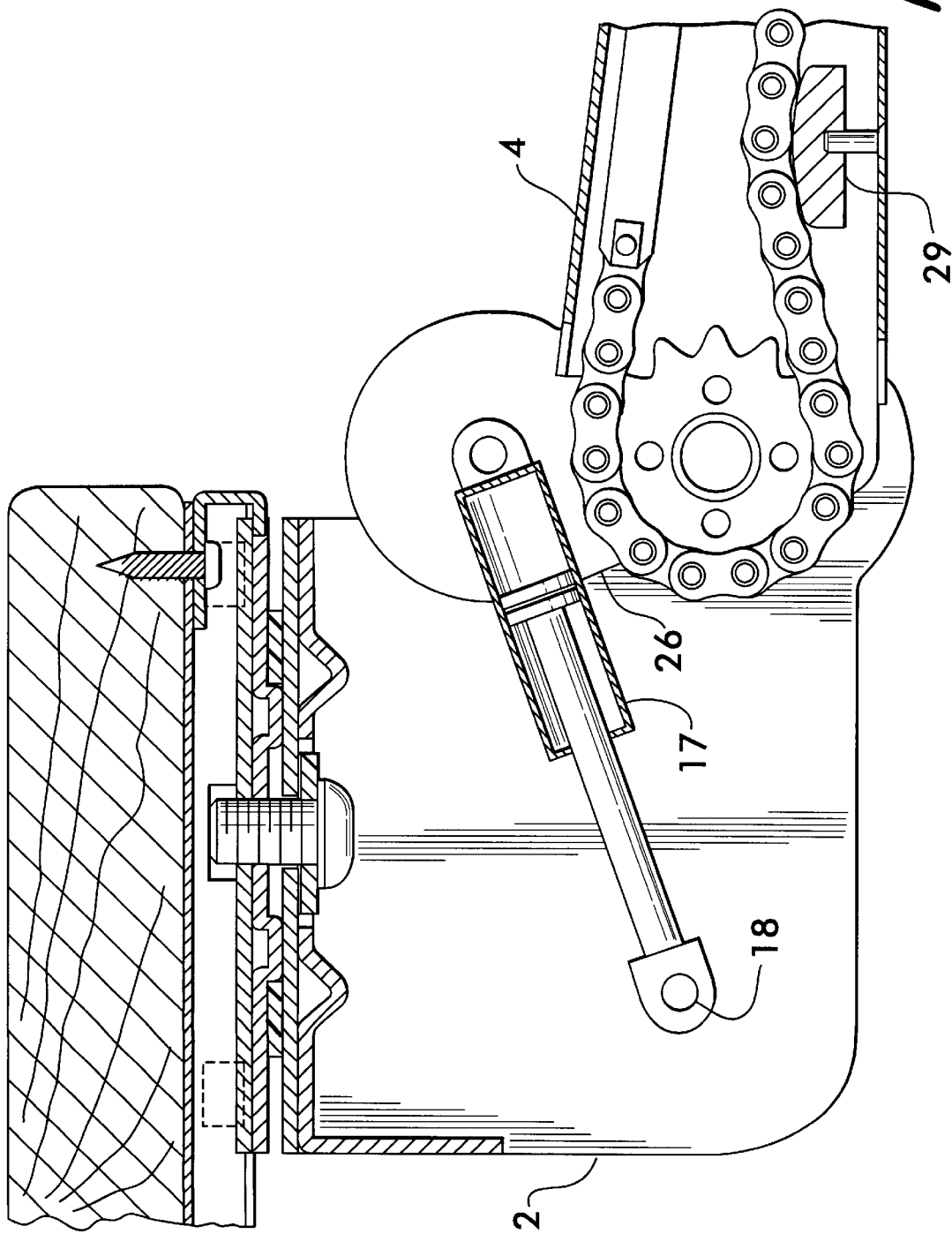

ADJUSTABLE SUPPORT APPARATUS

FIELD OF THE INVENTION

The current invention is directed to an apparatus for providing an adjustable support surface, such as that used to support visual monitors or computer keyboards. More specifically, the current invention is directed to an adjustable support apparatus that is capable of assuming varying heights and inclinations.

BACKGROUND OF THE INVENTION

Certain objects, such as data entry keyboards for use in connection with a computer and visual monitors, have been mounted on a support surface formed on an adjustable support apparatus that permits varying the height, as well as the inclination, of the support surface. Varying the height and inclination of the object reduces strain on the user. For example, varying the height and inclination of a keyboard permits its positioning to be adapted to the characteristics and preferences of the user and can prevent carpel tunnel syndrome.

In the past, apparatus for supporting keyboards have included an arm, the proximal end of which is rotatably mounted on a base that can be affixed to the underside of a desk. A support plate, on which the keyboard is mounted, is rotatably mounted on the distal end of the arm. Rotating the arm up or down at the base allows the height of the keyboard to be adjusted, while rotation of the support plate on the arm allows the inclination of the keyboard to be adjusted. Unfortunately, such apparatus suffer from several important drawbacks.

The first drawback concerns the locking of the orientation set by the apparatus. Various locking mechanisms have been used to lock the support arm and support plate in the desired orientation. Unfortunately, these mechanisms typically require operation of two or more knobs or levers to effect complete locking or unlocking—for example, one knob to lock/unlock the arm and another to lock/unlock the support plate. This makes adjustment of the apparatus more cumbersome.

The second drawback arises because traditional methods for mounting the support plate to the support arm cause the inclination of the support plate to vary as the arm is rotated up and down. Thus, although the user will often desire to maintain a constant, horizontal inclination for the keyboard, the resetting of the height of the keyboard will necessitate resetting of the inclination to maintain the keyboard horizontal.

The third drawback concerns restraining the downward motion of the support arm. If unrestrained, the weight load resulting from the combined weight of the support arm, support plate and keyboard creates a downward wight moment that can cause the support plate to drop very rapidly when the arm locking mechanism is disengaged. This could result in the keyboard striking the user or otherwise cause injury to the user or damage to the equipment. Consequently, various mechanisms have been used to restrain the downward motion of the arm.

One approach involves the use of a torsion spring that applies a moment that opposes the weight moment by tending to rotate the support arm upward. Unfortunately, the moment applied by a torsion spring is more or less linearly proportional to the angular orientation of the support arm. This is in contrast to the moment applied by the supported weight, which initially increases as the arm is rotated upward from its minimum height position, reaching a maximum when the arm is extended horizontally, and then decreases as the arm is further rotated to its maximum height. Thus, if a torsion spring is arranged to provide adequate force to offset the maximum weight moment when the arm is horizontal, as well as to provide at least some force when the arm is near its raised position, the upward force it will apply when the arm is in the lowered position can become excessive.

Another approach involves the use of a gas filled cylinder, similar to those used to restrain downward motion of the tailgate or hatch back in an automobile, which produces a substantially constant force. However, as heretofore used, the opposing moment resulting from gas filled cylinders did not match that of the weight moment as the arm rotated over its range of orientations so as to be a maximum value when the arm was horizontal, and weight moment a maximum, and a minimum value when the arm was rotated into its maximum or minimum height orientations, when the weight moment was at a minimum value.

Recently, it has been proposed that support apparatus for use in conjunction with data entry keyboards be capable of supporting the keyboard in positions that allow it to be used both when the user is seated and when standing. It is thought that affording brief opportunities for standing provide a respite that will enhance the productivity of data entry personnel. Achieving this objective will require a larger range of support plate heights, as compared to apparatus used only in the seated position. This, in turn, will require a longer support arm, which will result in a larger maximum moment as a result of the weight load, as well as a much larger difference between the maximum and minimum moments. In such applications, the failure of conventional approaches to more closely match the opposing moment to the weight moment is especially undesirable.

Consequently, it would be desirable to provide an adjustable support apparatus for an object, such as a keyboard or a visual monitor, that allowed both the height and inclination locking mechanisms to be engaged and disengaged by a single operation of the user's hand, that allowed the inclination of the support to be maintained constant throughout the range of vertical motion, and that provided for smoother and safer operation by creating an opposing moment that more closely matched the moment resulting from the supported weight.

SUMMARY OF THE INVENTION

It is an object of the current invention to provide an adjustable support apparatus for an object, such as a keyboard or a visual monitor, that allowed both the height and inclination locking mechanisms to be engaged and disengaged by a single operation of the user's hand, that allowed the inclination of the support to be maintained constant throughout the range of vertical motion, and that provided for smoother and safer operation by creating an opposing moment that more closely matched the moment resulting from the supported weight.

These and other objects are accomplished in an adjustable support apparatus for supporting an object thereon comprising (i) a base, (ii) a rotatable support arm coupled to the base, the support arm capable of being rotated over a range of angular orientations within a vertical plane, (iii) a support member coupled to the support arm, the support member forming a support surface for supporting the object thereon, whereby the support member transmits a load onto the support arm that creates a first varying moment tending to rotate the support arm downward within the vertical plane, the magnitude of the first moment varying depending on the angular orientation into which the support arm is rotated, (iv) means for generating a substantially constant force, and (v) means for transmitting the substantially constant force to the arm so as to create a second varying moment tending to rotate the support arm upward, the magnitude of the second moment varying depending on the angular orientation to which the support arm is rotated, whereby the downward rotation of the support arm is at least partially resisted, and upward rotation of the support arm is more easily effected by the user.

Preferably, the means for generating a constant force comprises an elongate spring member pre-stressed so as to form a winding that can be mounted on a rotatable core and having a first end, whereby extending the first end so as to unwind the spring member from the core generates a force tending to retract the first end of the spring member, the retraction force being substantially constant regardless of the amount by which the first end is extended within a predetermined range of extensions.

The invention also encompasses an adjustable support apparatus having (i) first locking means for locking the support arm into a first fixed angular orientation when the first locking means is engaged, (ii) second locking means for locking the support member into a second fixed angular orientation when the second locking means is engaged, and (iii) means for essentially simultaneously disengaging the first and second locking means by no more than a single operation of the user's hand.

The invention also encompasses an adjustable support apparatus having means for maintaining the inclination of the support surface constant despite the rotation of the support arm through a range of angular orientations.

The invention also encompasses an adjustable support apparatus comprising (i) locking means for locking the support arm into a first fixed angular orientation when the locking means is engaged, and (ii) means for automatically disengaging the locking means when the support arm is rotated upward by the user and for automatically re-engaging the locking means when the user ceases further upward rotation of the support arm.

BRIEF DESCRIPTION OF THE DRAWINGS

FIG. 3 is an isometric view similar to FIG. 1 but with certain covers removed.

FIG. 4 is a longitudinal cross-section of the keyboard support apparatus shown in FIG. 2 attached to a desk.

FIG. 4(a) is an alternate embodiment, partially schematic, of the key board support apparatus shown in FIG. 4.

DESCRIPTION OF THE PREFERRED EMBODIMENT

Figure 1:
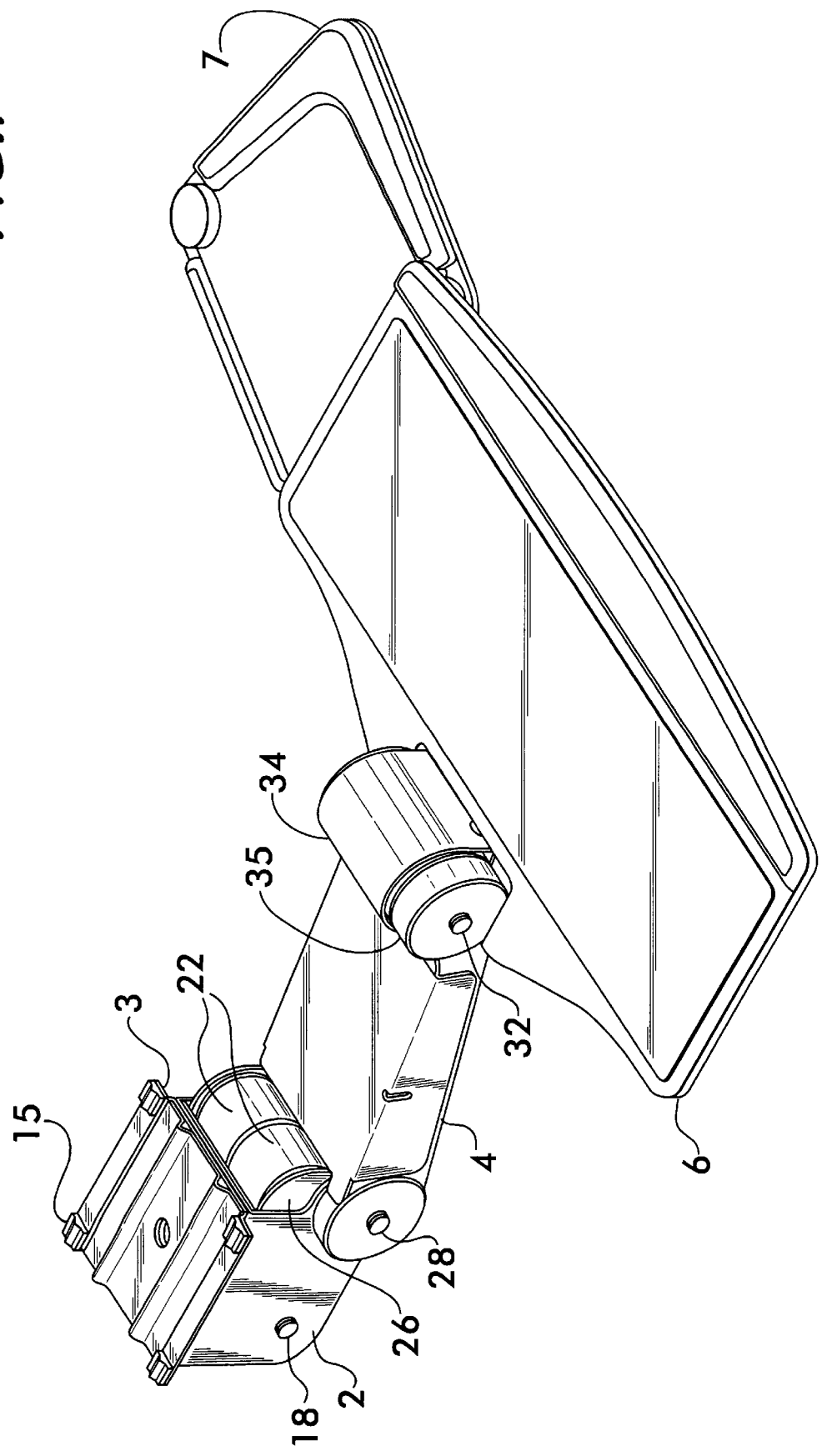
FIG. 1 an isometric view of an adjustable keyboard support apparatus according to the present invention.

An adjustable support apparatus according to the current invention is shown generally in FIGS. 1–4. The apparatus comprises a base 2, to which a support arm 4 is rotatably mounted, and a keyboard support 6. The keyboard support 6 is formed from a rigid sheet, preferably, a composite sheet formed by bonding a thin sheet of aluminum to a thermoplastic core. Suitable composite sheets are available from Alusuisse Composites, Inc., of Benton, Ky., under the trade name Alucobond™. The keyboard support 6 has a non-slippery work surface 7 that is adapted to retain a keyboard (not shown). As is well known in the art, various types of brackets and clamps could also be attached to the keyboard support 6 to aid in retention of the keyboard. In addition, as shown in FIG. 1, a mouse pad 7 can be secured to a corner of the keyboard support 6 by a pivot joint that allows the mouse pad to be rotated outward for use but rotated under the keyboard support for storage.

Figure 2:
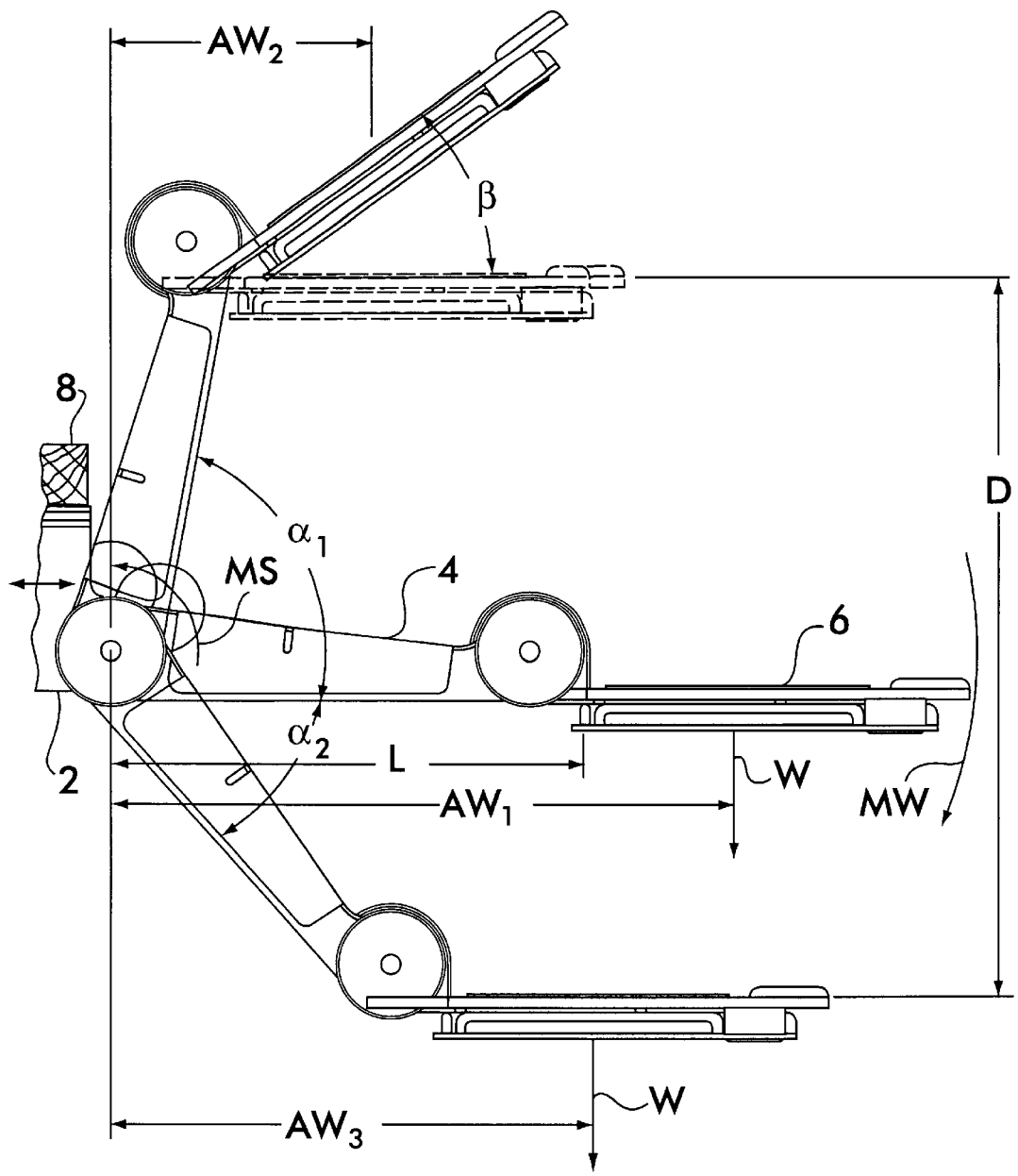
FIG. 2 is an elevation view of the keyboard support shown in FIG. 1, attached to the underside a desk, in three different orientations.

As shown best in FIG. 4, the top of the base 2 is rotatably attached to a trolley 3 by means of a screw 5. Rotation of the base 2 on the trolley 3 allows the support arm 4 and keyboard support 6 to be rotated in a horizontal plane. The trolley 3 is slidably retained on plastic glides 15 within a track 12 that is attached to the underside of a desk surface 8 by means of screws 9. A stop 13 prevents the trolley 3 from sliding out of the track 12. As indicated in FIG. 2, this arrangement allows the base 2 to be slid under the desk 8 and rotated out of the way when the apparatus is not in use. Other methods of mounting the base 2 to a structure, which are well known in the art, could also be utilized.

Figure 5:
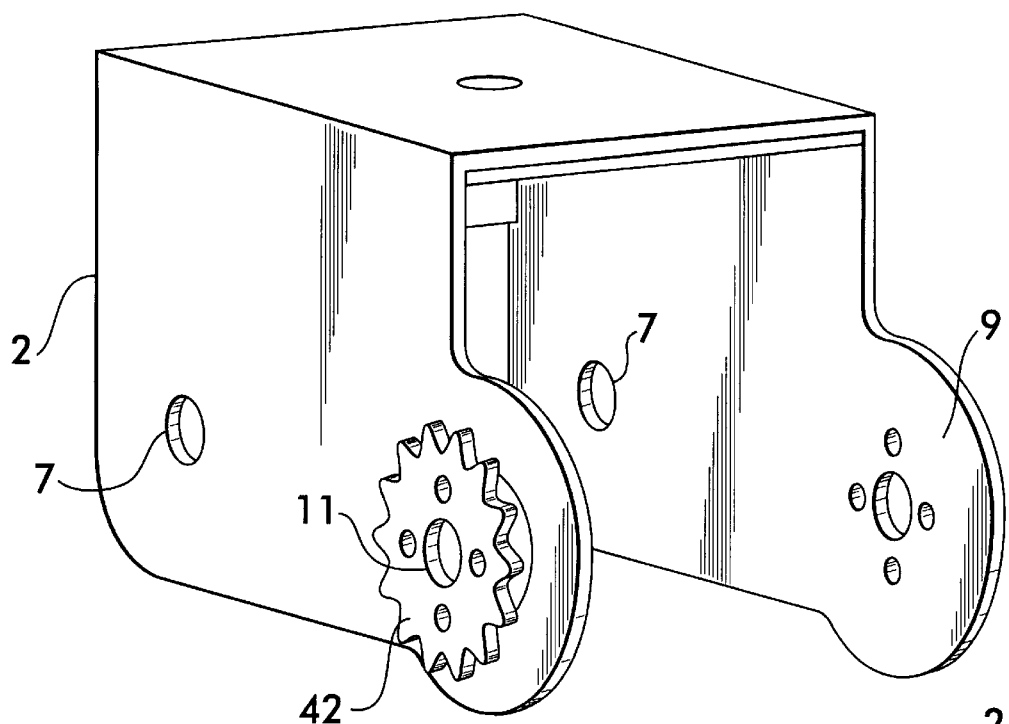
FIG. 5 is an isometric view of the base portion of the support apparatus shown in FIG. 1.
Figure 6:
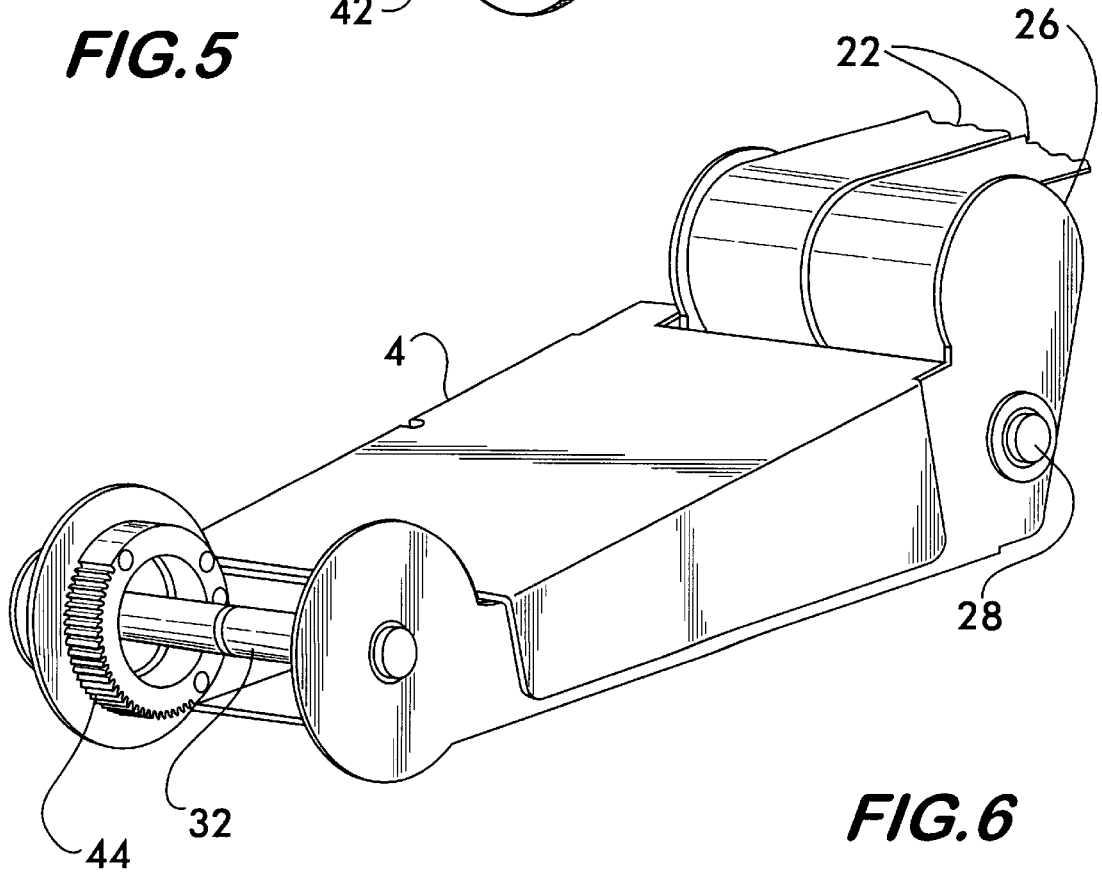
FIG. 6 isometric view of the arm portion of the support apparatus shown in FIG. 1.

As shown best in FIG. 5, a pair of aligned holes 7 are formed in the rear of the side walls of the base 2. The holes 7 rotatably retain a shaft 18 that supports a constant force mechanism, discussed further below. A stationary sprocket 42 is fixedly attached to the forward end of one of the side walls of the base 2. A hole 11 in the base sprocket 42 is aligned with holes in the side wall 9 that rotatably support a shaft 28, which extends across the width of the arm. As shown in FIGS. 3, 4 and 6, the support arm 4 is rotatably mounted on the shaft 28 so that it pivots about the shaft.

The rear portions of the support arm 4 extend upward so as to form spring drum support arms 26 that also pivot about the shaft 28. A cylindrical drum 24 is fixedly attached between the drum support arms 26. A shaft 32 is rotatably mounted on the forward end of the support arm 4. As shown best in FIGS. 11 and 12, a support plate 14 is rotatably mounted on the shaft 32 by means of flanges 50 and 52, in which holes 54 and 55, respectively, are formed and through which the shaft extends. The keyboard support 6 is mounted via screws (not shown) on the support plate 14.

The support arm 4 can be rotated about the shaft 28 over a range of angular orientations within a vertical plane so as to provide the desired range of height variation, indicated by D in FIG. 2, for the keyboard support 6. Although the invention can be applied to apparatus having any range of height variation, the invention is especially advantageous when used in apparatus in which the keyboard height varies more than 7 inches, since the magnitude and variation in the weight moment is likely to be large in such apparatus. As shown in FIG. 2, in a preferred embodiment of the invention, the support arm 4 can be rotated upward from the horizontal by an angle $\alpha_1$, which is preferably at least about 84°, and downward below the horizontal by an angle $\alpha_2$, which is preferably at least about 48°, so that the total range of angular motion a of the support arm 4 is at least about 132°. As discussed below, a locking mechanism allows the arm 4 to be locked at multitude of discrete angular orientations, such as every 6°, throughout this range. The length L of the support arm 4 is preferably at least about 11 inches. The relatively long support arm length L, when combined with its relatively large range of angular orientations α, allows the height of the keyboard support 6 to be varied by about 18 inches (i.e., D=18 inches). This allows the keyboard support 6 to be placed sufficiently low (e.g., 16 inches above the floor when attached to the underside of a desk displaced 28 inches from the floor) to allow the keyboard to be comfortably used in a seated position, and sufficiently high (e.g., 34 inches above the floor) to allow it to be comfortably used in a standing position.

In addition, as also shown in FIG. 2, the keyboard support 6 can be rotated upward from the horizontal orientation over an angular range β, which is preferably at least about 36°. As discussed below, another locking mechanism allows the keyboard support 6 to be locked at multitude of discrete angular inclinations, such as every 6°, throughout this range. This range of inclination further facilitates the use of the keyboard at a variety of heights. For example, although users will most often desire that the keyboard be maintained at a horizontal inclination, an inclined keyboard support 6 is especially desirable when the keyboard is used in the standing position.

As previously discussed, the weight of the keyboard, keyboard support 6 and support arm 4 creates a force, indicated by W in FIG. 2, that applies a moment MW that tends to rotate the support arm downward. The moment MW varies depending on the angular orientation of the support arm 4. The moment MW is a maximum when the arm 4 is in the horizontal orientation, in which case the effective moment arm is at its maximum value $AW_1$. The moment is a minimum when the arm 4 is raised to its maximum height, in which case the effective moment arm is reduced to $AW_2$. The moment MW has an intermediate value when the arm 4 is lowered to its minimum height, in which case the effective moment arm is $AW_3$. This is shown diagrammatically in FIG. 10(a), in which the moment applied by the weight, MW, is plotted versus the angular orientation a of the arm 4. Ideally, the support apparatus should generate an opposing moment the magnitude of which exactly equaled the magnitude of the weight moment over the entire range of angular orientations so that the keyboard support was essentially weightless, remaining in place at any height to which it was placed, and could be raised or lowered with very little effort.

According to an important aspect of the current invention, a novel mechanism is utilized that substantially accomplishes this objective. It creates an opposing moment, indicated by MS in FIGS. 2 and 10, that prevents the support arm 4 from rotating downward rapidly when the height locking mechanism, discussed below, is released, as well as reduces the force the user must apply to raise the arm. Further, the mechanism produces a varying opposing moment MS that closely matches the weight moment MW as it varies with the angular orientation of the support arm 4.

As shown in FIG. 4(a), a gas filled cylinder 17, connected between the base 2 and arm 26', could be used to supply a constant force to the arm 26'. Such cylinders are typically filled with nitrogen and have two chambers so as to maintain the force exerted by the piston substantially constant. Suitable constant force gas filled cylinders are available from Stabilus, 1201 Tulip Drive, Gastonia, N.C. 28052. However, in the preferred embodiment of the invention, the constant force mechanism comprises two coiled, flat springs 16, operating in parallel, that create a substantially constant force over a large range of extensions as shown in FIGS. 3, 4, 6 and 7. Constant force springs are less expensive than gas filled cylinder, have a greater range of travel, and are more easily adapted for use in the current invention. As used herein, the term "substantially constant force" refers to a force that varies no more than ±25% over the range of angular orientation a of the support arm 4. Preferably, the characteristics of the spring 16 are such that the force varies no more than about ±10% over this range.

Constant force springs 16, sometimes referred to as "negator" springs, are formed by pre-stressing an elongate flat strip of spring metal 22, such as stainless steel, that is circumferentially wound upon itself in overlapping layers so as to form an almost constant radius winding that can be mounted on a core 20. Extension of the free end of the strip unwinds the strip and creates a force tending to retract the strip back around the core 20. After the free end of the strip 22 has been extended an initial minimum distance, further extension creates a force that is substantially constant over a substantial portion of the working distance. For example, after an initial minimum extension of about 3.27 inches, a constant force extension spring formed by pre-stressing and wrapping a 48 inch long by 1.5 inch wide by 0.025 inch thick strip of 301 stainless steel around a 2.18 inch diameter bushing creates a retraction force of about 24.8 pounds ±10% up to a maximum deflection of about 36 inches. Suitable constant force negator springs are commercially available from Ametek Hunter Spring Products, 900 Clymer Avenue, Sellersville, Pa. 18960, under the trade name Neg'ator™.

Figure 7:
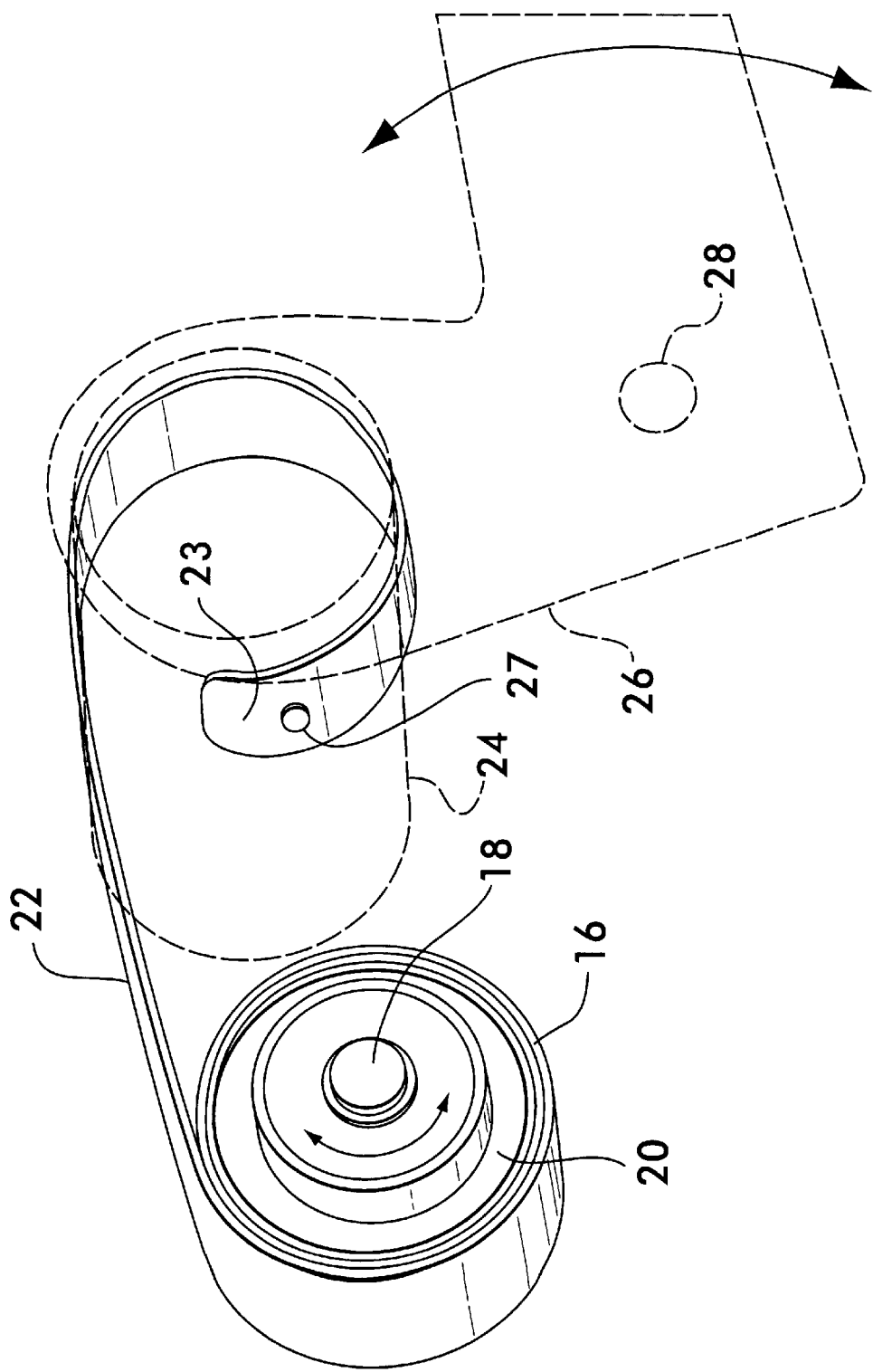
FIG. 7 is an anisometric view, partially schematic, of the spring mechanism of the support apparatus shown in FIG. 1.

As shown in FIGS. 4 and 7, the free end 23 of each of the constant force springs 16 is attached via two screws 27 (only one of which is shown) to the drum 24. Rotation of the support arm 4 about the shaft 28 causes the drum support arms 26 to also rotate about the shaft. When the support arm 4 is rotated downward, the drum 24 acts like a cam to displace and extend the spring 16, thereby generating a force tending to retract the spring. Thus, as the support art 4 rotates from its maximum height to its minimum height angular orientations, the spring 16 undergoes extensions over a predetermined range. Preferably, the spring 16, drum 24, and drum support arms 26 are sized and arranged so that the initial minimum extension required to obtain substantially constant force thereafter is achieved throughout the entire range of rotation of the support arm 4 and so that the maximum extension beyond which substantially constant force is no longer achieved is not exceeded.

The retraction force generated by the spring 16 is transmitted to the drum 24 and applies a moment, indicated as MS in FIG. 2, that tends to rotate the support arm upward and, consequently opposes the downward moment MW. The value of the opposing moment MS is equal to the spring force multiplied by the effective length of the moment arm created by the drum support arms 26. The upward moment MS applied by the spring 16 prevents the support arm 4 from dropping downward too rapidly and assists the user in raising the arm.

Figure 8:
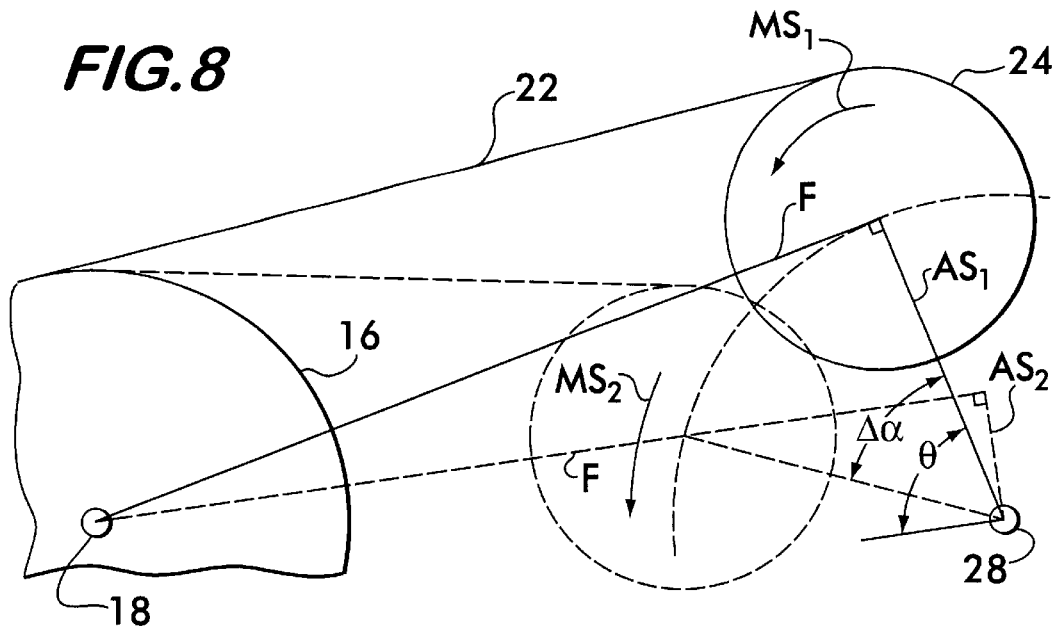
FIG. 8 is a schematic force diagram showing the moment created by the spring mechanism shown FIG. 7 when the support arm is in two orientations.

Importantly, although the force, indicated by F in FIG. 8, applied by the spring 16 to the drum 24 remains substantially constant, the rotation of the drum support arms 26 causes the moment MS to varying depending on their angular orientation. As shown in FIG. 8, the spring force F acts along a line extending between the centerline of the spring shaft 18 and the centerline of the drum 24. When the support arm 4 is oriented slightly above the horizontal, at which orientation the weight moment MW is close to its maximum value, the line extending between the center of the shaft 28 and the center of the drum 24, which is oriented at an angle $\theta$ to the horizontal, is perpendicular to the direction in which the spring force F acts. Thus, in this orientation, the effective moment arm for the spring force F is at its maximum value $AS_1$ so that the opposing moment $MS_1$, which equals $AS_1 \times F$, is also at its maximum value.

As previously discussed, when the support 4 is rotated upward, the magnitude of the weight moment MW decreases. According to the current invention, this upward rotation of the support arm 4 also decrease the magnitude of the opposing moment MS generated by the spring 16. As shown in FIG. 8, as the support arm 4 rotates upward by an amount $\Delta\alpha$, the drum 24, carried by the drum support arms 26, rotates downward by the same amount. This downward rotation brings the drum 24 closer to the spring so as to reduce the extension of the spring 16. Nevertheless, as previously discussed, owing to the characteristics of the spring 16, the spring force F remains substantially constant. However, the angle at which the force F is applied to the drum 24 varies. Specially, the angle at which the force F is applied relative to the line extending between the centerline of the shaft 28 and the centerline of the drum 24 becomes greater than 90°, so that the effective length of the moment arm, indicated as $AS_2$ in FIG. 8, is reduced, thereby reducing the magnitude of the opposing moment $MS_2$.

A similar result obtains when the support arm 4 is rotated downward below the horizontal Although downward rotation of the support arm 4 rotates the drum 24 away from the spring 16, and thereby increases its extension, the spring force F remains substantially constant. However, the angle at which the force F is applied relative to the line extending between the centerline of the shaft 28 and the centerline of the drum 24 becomes less than 90°, so that the effective length of the moment arm is again reduced, thereby reducing the magnitude of the opposing moment MS. The magnitude of the opposing moment MS versus the angular orientation a of the support arm 4 is graphically depicted in FIG. 10(a) along with the weight moment MW. As can be seen, like the weight moment MW, the opposing moment MS is at a minimum, $MW_{min}$, when the support arm 4 has been rotated upward by an angle $\alpha_1$ to its maximum height. The opposing moment reaches a maximum value, $MS_{max}$, when the support arm 4 is close to its horizontal orientation, at which point the weight moment MW is almost at its maximum value, $MW_{max}$. As the support arm 4 is rotated downward by an angle $\alpha_2$ to its minimum height, the opposing moment MS, like the weight moment, MW, drops to an intermediate value $MS_3$.

Figure 10A:
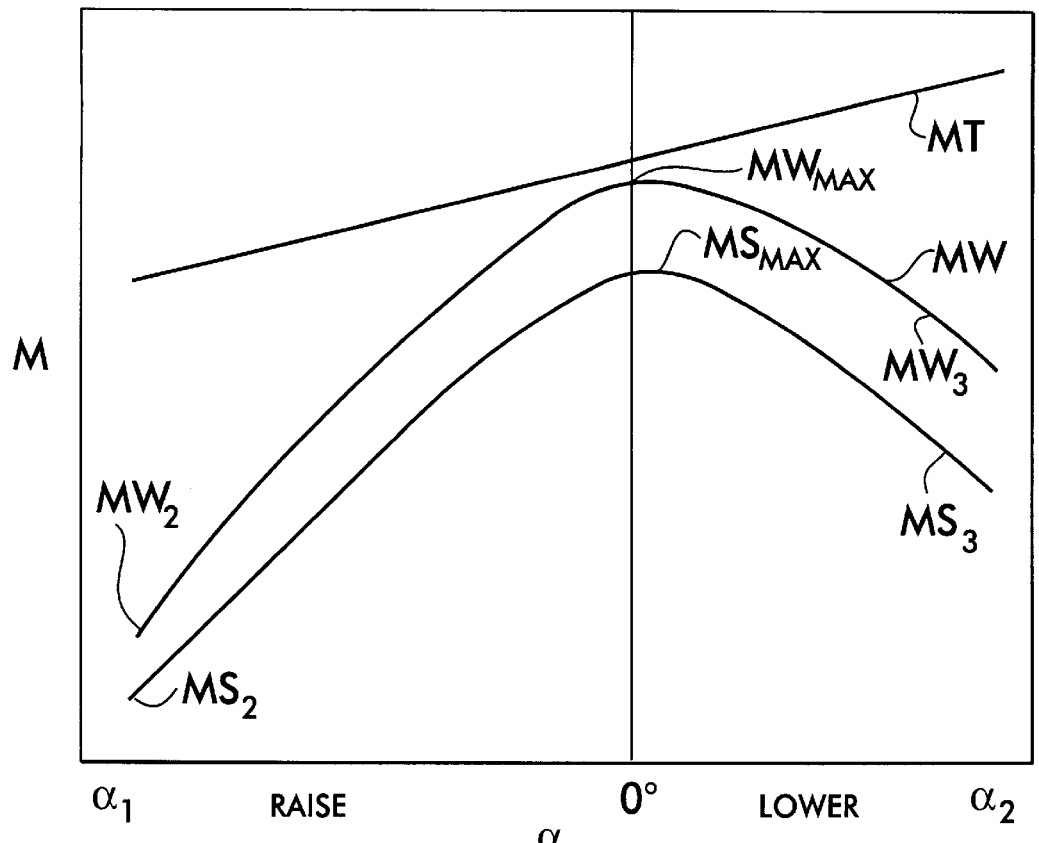
FIG. 10(a) is a graph showing the moments applied to the support arm by (i) the weight of the support structure and keyboard (MW), (ii) a constant force spring according to the current invention (MS), and (iii) a conventional torsion spring (MT).
Figure 10B:
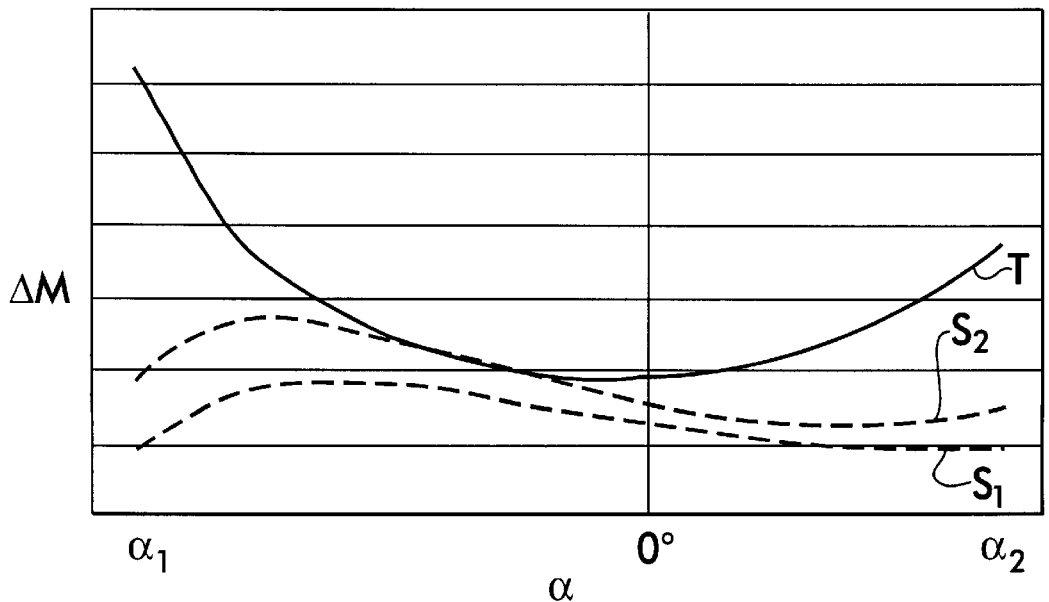
FIG. 10(b) is a graph showing the difference between the moment applied to the support arm by the weight of the support structure/keyboard on the one hand, and, on the other hand, the moments applied by (i) spring mechanisms according to the current invention having a cylindrical drum ($S_1$) and a non-cylindrical drum ($S_2$), and (ii) a conventional torsion spring mechanism (T).

The difference AM between the opposing moment MS and the weight moment MW over the range of angular orientations of the support arm 4 is graphically depicted in FIG. 10(b). As can be seen, for the embodiment shown in FIGS. 1–8, the difference in moments, indicated by the curve marked $S_1$, is relatively small throughout the range. Thus, if no additional external force is applied, the support plate 6 will tend to remain stationary at any given height to which it is placed and can be raised or lowered to any other height with little effort.

This is in contrast to the conventional torsion spring approach. As shown in FIG. 10(a), a torsion spring can be affixed to the support arm so as to create an opposing moment MT that is relatively close to the weight moment MW when the arm is in the horizontal orientation. However, when the arm is rotated to it maximum and minimum heights, the torsion spring creates too great a moment. If the spring constant were increased so that the opposing moment more closely matched the weight moment when the arm was raised to its maximum height and in the horizontal orientation, the opposing moment when the arm was lowered to its minimum height would effectively catapult the keyboard when the height locking mechanism was disengaged. This situation is prevented by the novel structure of the current invention.

Figure 9:
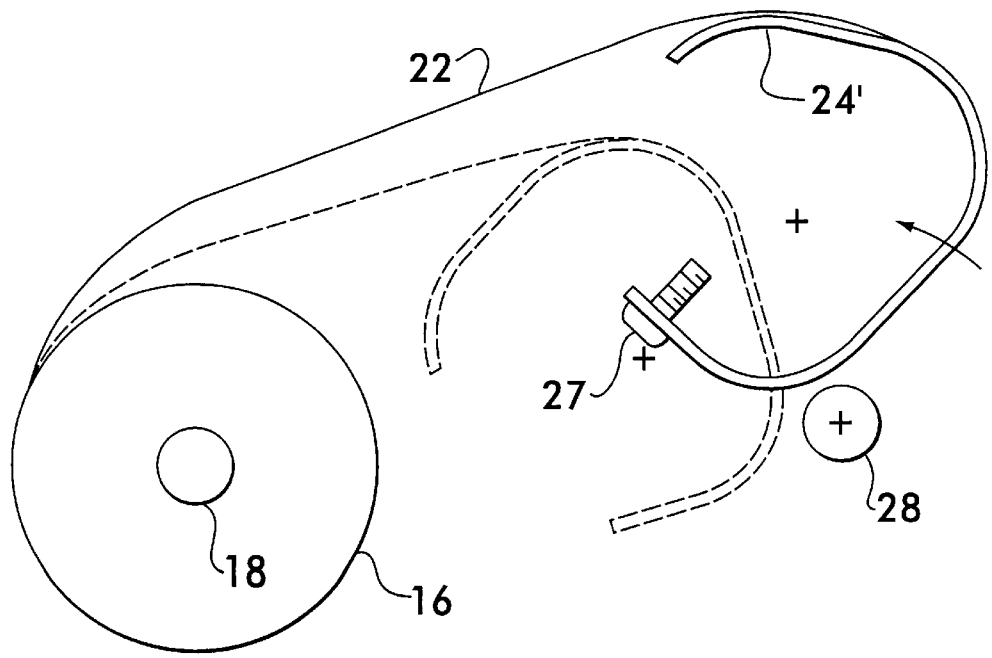
FIG. 9 is a cross-section, partially schematic, of an alternate embodiment of the spring drum.

Although the embodiment shown in FIGS. 1–8 represents a considerable improvement over the prior art, according to the current invention, various modifications can be made to more closely match the opposing moment MS to the weight moment MW. For example, the cylindrical of the drum 24, which as previously discussed acts as a cam for the spring 16, could be replaced with a cam surface having a more complex shape, such as that shown in FIG. 9. The shaping of the surface of the drum 24' allows the variation in the magnitude of the opposing moment to be more finely tuned so as to more closely match the weight moment. Curve $S_2$ in FIG. 10(b) shown the difference between the opposing moment and the weight moment using the drum 24' shown in FIG. 9. Other variations to the shape of the drum surface, as well as the angle of the drum relative to the support arm 4 and the length of the drum support arms 26, can also be made, according to the teachings of the current invention, in order to achieve optimal variation of the opposing moment. Preferably, the magnitude of the opposing moment MS is within at least about ±25%, and preferably within about ±10%, of the magnitude of the weight moment MW over a major portion, and preferably over the entirety, of range of angular orientation α of the support arm.

As discussed in detail below, according to the current invention, locking mechanisms are provided to lock the height of the support arm 4 and the inclination of the support plate 14 at the desired settings.

Figure 13:
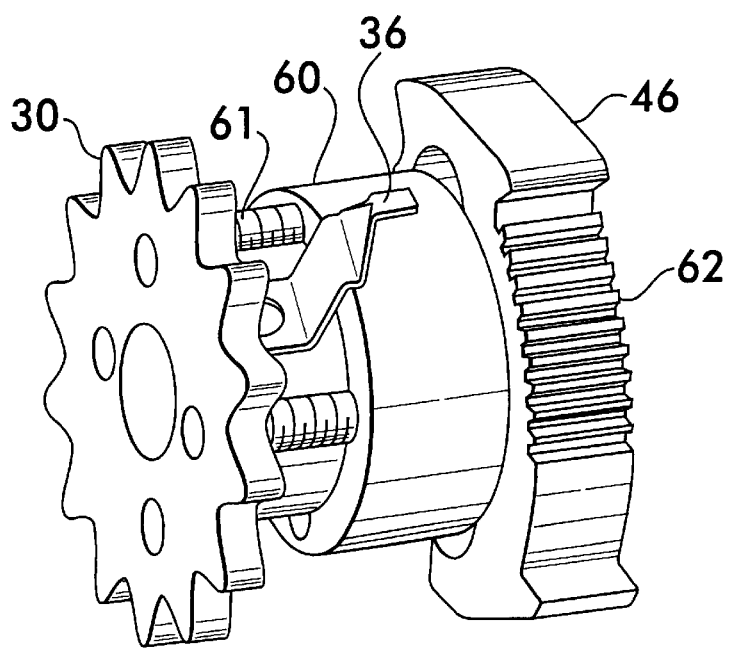
FIG. 13 is an isometric view of the sprocket and inclination locking ratchet assembly of the locking mechanisms shown in shown in FIG. 11.

As shown in FIG. 4, a chain 38 is wrapped around the stationary sprocket 42, affixed to the base 2, and a second sprocket 30 mounted at the end of the support arm 4. A solid turnbuckle adjustment mechanism 40, allows the length of the chain 38 to be adjusted. As shown best in FIG. 13, the second sprocket 30 is attached, via screws 61, to a bushing 60 that extends through a height ratchet 44, which forms a portion of the height locking mechanism. The screws 61 also attach the sprocket 30 and bushing 60 to an inclination ratchet 46, which forms a portion of the inclination locking mechanism.

Figure 11:
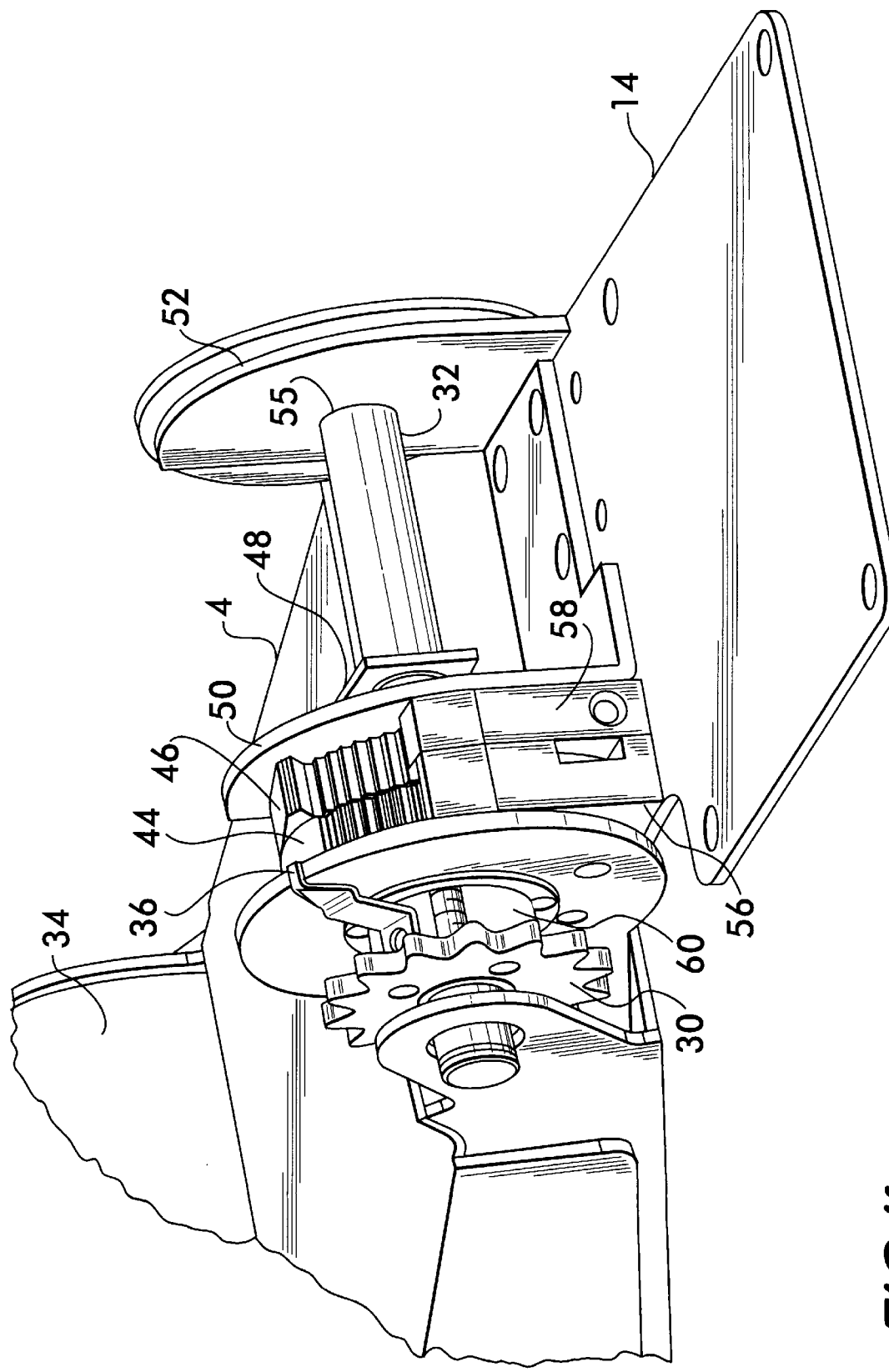
FIG. 11 is an isometric view of the support plate and the height and inclination locking mechanisms of the support apparatus shown in FIG. 1.
Figure 12:
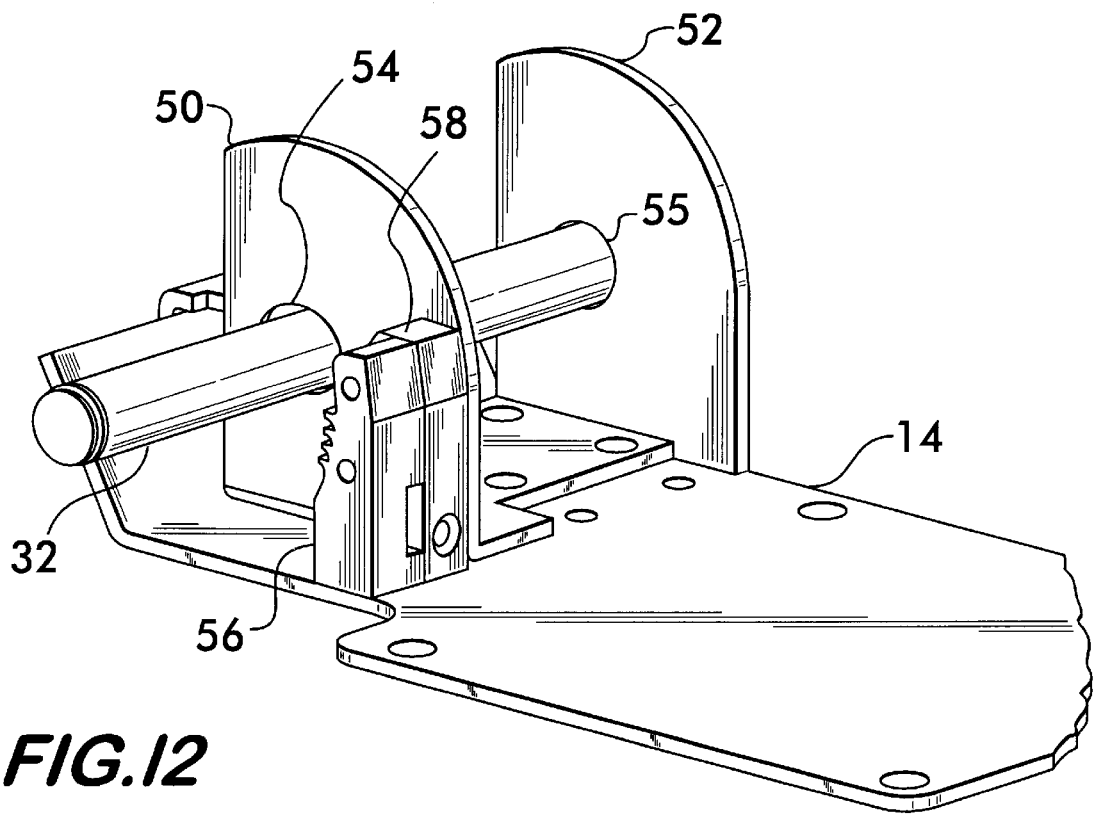
FIG. 12 is an isometric view of the support plate shown in FIG. 11.

As shown best in FIG. 11, this assembly (i.e., the sprocket 30, bushing 16, and inclination ratchet 46) is mounted on the shaft 32 so that these components operate as a unit on the shaft 32. Thus, as the support arm 4 rotates, the chain 38 travels, slightly, around the sprockets. However, since sprocket 42 is fixed to the base 2, the chain 38 prevents sprocket 30 from rotating. Thus, sprocket 30 maintains a fixed angular orientation despite the rotation of the support arm 4 on which it is rotatably mounted—that is, the support arm 4 rotates relative to the sprocket 30, but the sprocket 30 remains in a fixed angular orientation. Since the height ratchet 44 is affixed to the end of the support arm 4, it rotates with it and around the bushing 60. Thus, relative to a fixed frame of reference, as the support arm 4 rotates, the sprocket 30 and inclination ratchet 46 remain in a fixed angular orientation, while the support arm and height ratchet rotate around the shaft 32.

Figure 20A:
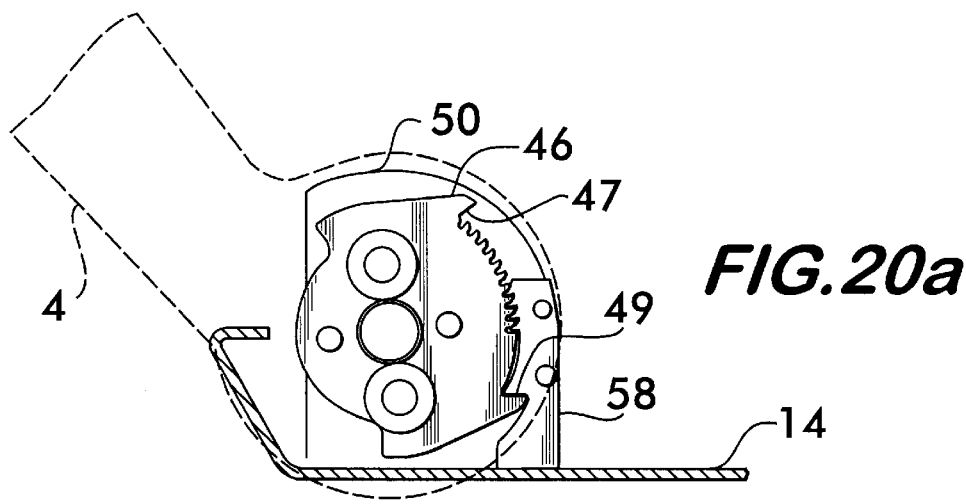
FIGS. 20(a)–(c) show the inclination locking mechanism shown in FIG. 11 with the support arm and support plate in each of two different angular orientations.
Figure 20B:
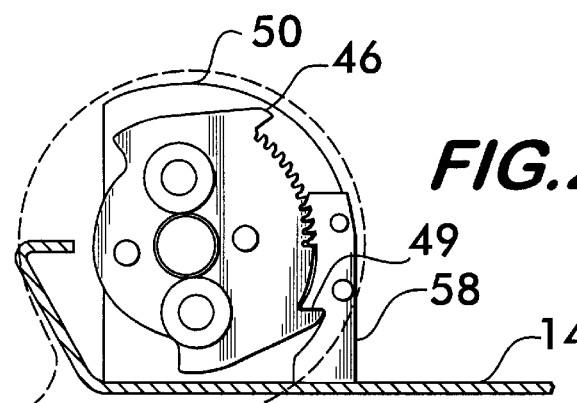

Since the inclination ratchet 46 is fixed to the sprocket 30, it also maintains its angular orientation as the support arm 4 rotates. This is shown in FIGS. 20(a) and (b), which illustrates that the inclination ratchet 46 is maintained in a fixed orientation relative to a fixed frame of reference as the support arm rotates from its lowered position, shown in FIG. 20(a), to its raised position, shown in FIG. 20(b). A dowel (not shown) extends transversely from the height ratchet 44 so as to engage the inclination ratchet 46 when the support arm 4 reaches its maximum height, and again when the support arm reaches its minimum height, thereby providing stops that set the range of angular orientation a of the support arm.

Figure 14:
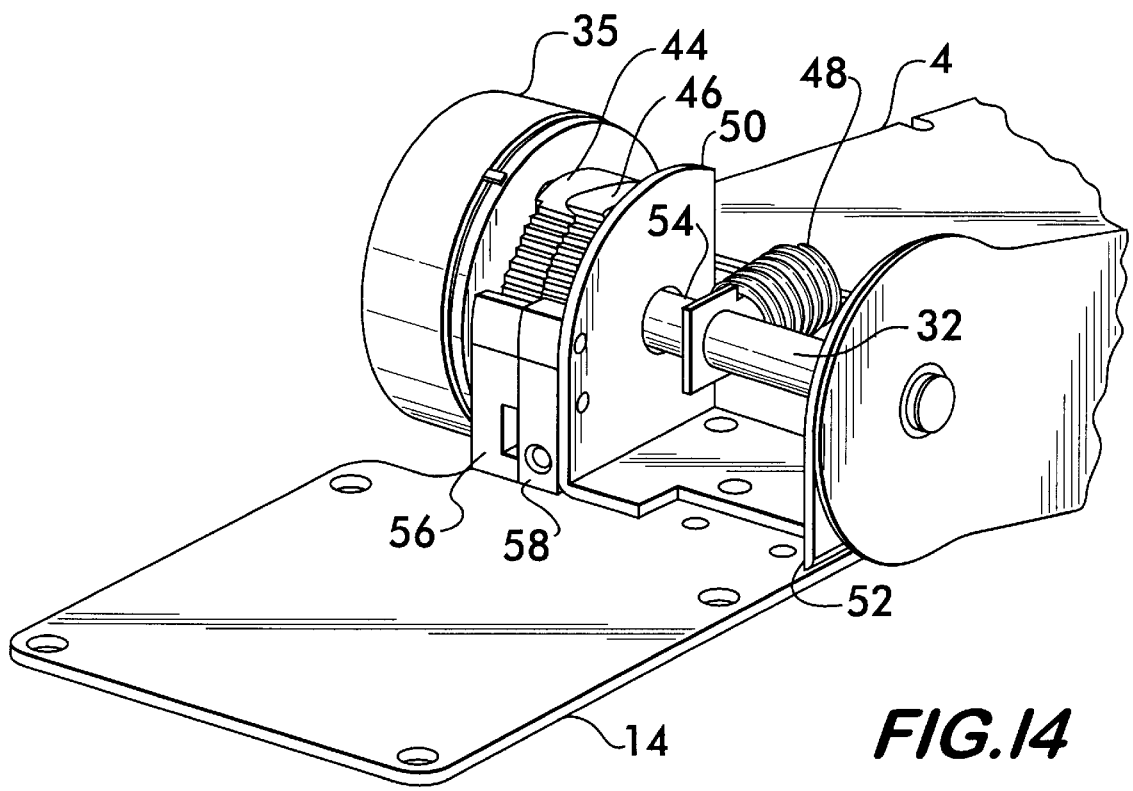
FIGS. 14 and 15 are isometric and plan views, respectively, showing the disengagement of the height and inclination locking mechanisms shown in FIG. 11, with a partial section being taken through the flange portions of the support plate.
Figure 18A:
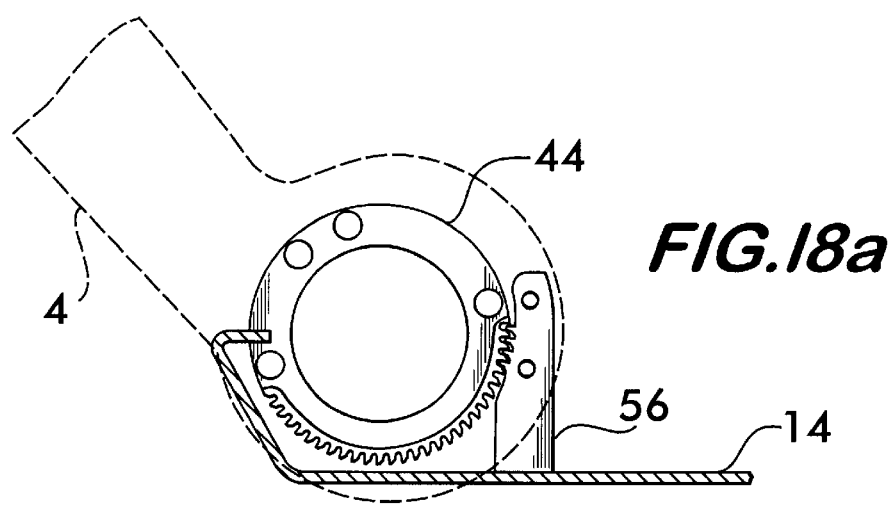
FIGS. 18(a)–(c) show the height locking mechanism shown in FIG. 11 with the support arm and support plate in each of two different angular orientations.
Figure 18B:
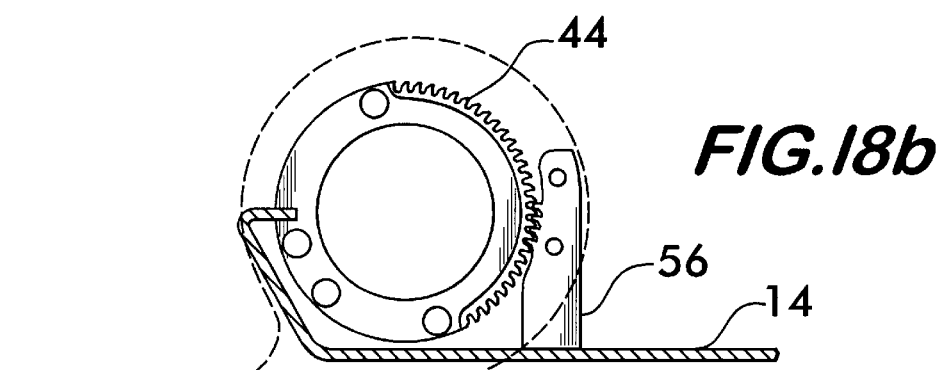
Figure 18C:
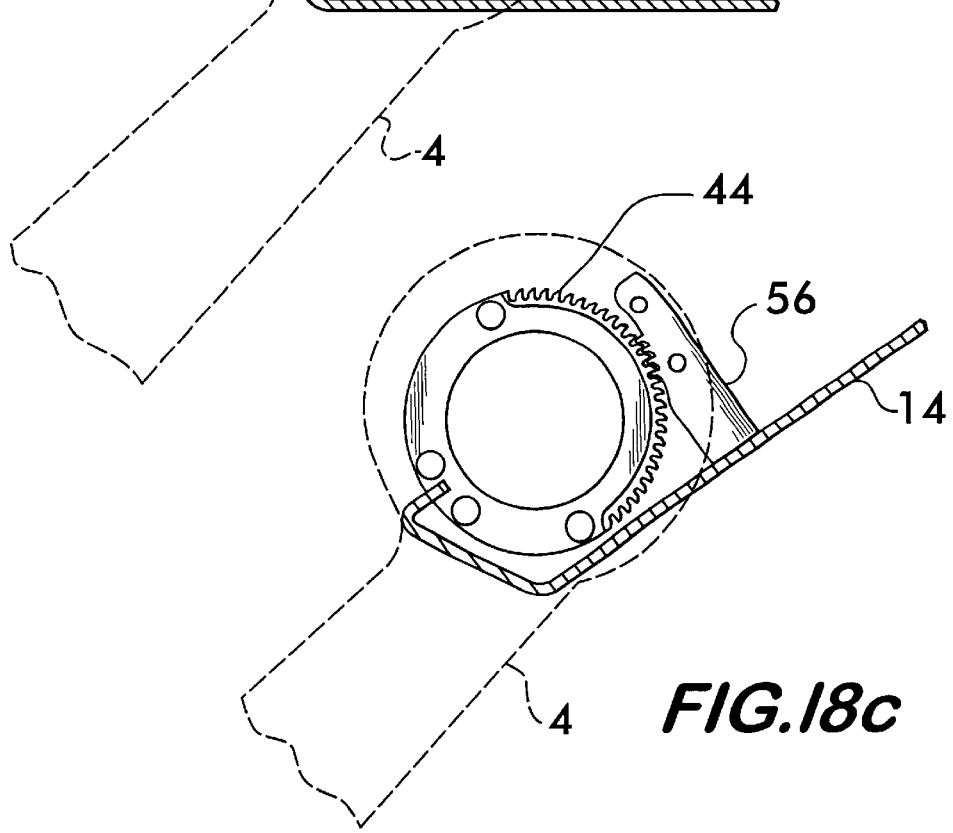

As shown best in FIGS. 11 and 14, a inclination pawl 58 is affixed to the support plate 14 so as to engage the inclination ratchet 46 under the urging of a tension spring 48, which extends from the shaft 32 to the support arm 4. The height pawl 56, which is also affixed to the support plate 14, is similarly urged into engagement with the height ratchet 44. The holes 54 and 55 in the support plate flanges 50 and 52 are located so that the when the tension spring 48 pulls the shaft 32 rearward, the shaft pulls the flanges, and hence the support plate 14, rearward as well. The motion of the support plate 14 causes the teeth on the inclination pawl 58 to engage the teeth on the inclination ratchet 46, as shown in FIG. 20, and causes the teeth on the height pawl 56 to engage the teeth on the height ratchet 44, as shown in FIG. 18. The teeth of both the height and inclination ratchets and pawls are pitched the same so that both pair of ratchet/pawl mechanism can be fully engaged at the same positioning.

Figure 20C:
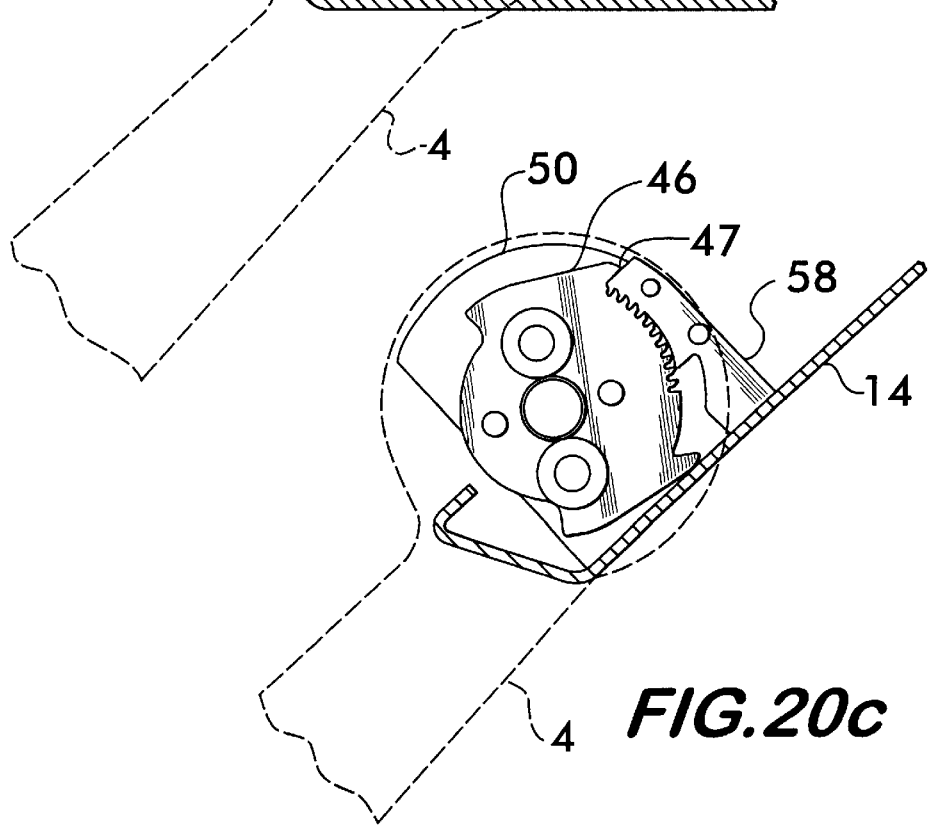

The engagement of the inclination pawl 58 with the inclination ratchet 46 locks the inclination of the support plate 14. Upper and lower stops 47 and 49, respectively, are formed on the inclination ratchet 46 and limit the amount by which the inclination pawl 58 can rotate, thereby limiting the range of angular orientations of the support plate 14. Thus, when the pawl 58 is against the lower stop 49, as shown in FIGS. 20(a) and (b), the support plate 14 is oriented horizontally. When the pawl 58 is against the upper stop 47, as shown in FIG. 20(c), the support plate 14 is oriented at its maximum inclination (e.g., 36°). Intermediate inclinations are obtained by intermediate engagements of the pawl 58 and ratchet 46. In a preferred embodiment of the invention, the ratchet and pawl teeth are spaced at 6° intervals so that the angular orientation of the support arm 4 and the inclination of the support plate 14 can each be set at intervals of 6° (e.g., 0°, 6°, 12°, etc.). However, smaller or larger intervals could also be utilized.

So long as the inclination ratchet and pawl 46 and 58 are engaged, thereby locking out rotation of the support plate 14, the engagement of the height ratchet and pawl 44 and 56 serves to lock the angular orientation of the support arm 4 because the arm cannot rotate relative to the sprocket 30, which, as previously discussed, is restrained by the chain 38. When a load is placed on the support plate 6, the upper portion of the chain 38 is placed in tension so as to absorb a portion of the load, thereby providing structural support for the arm 4. The turnbuckle 40 provides a means of adjusting the length of the upper portion of the chain 38 so as allow accurate control of the support plate 14 positioning to account for chain wear and manufacturing variations. A tensioner 29 adjusts the length of the lower portion of the path taken by the chain 38 in order to minimize slack, which could result in support plate instability. The tensioner 29 is preferably an adjustable height steel pad that presses the chain 38 upward.

As discussed in detail below, according to another important aspect of the current invention, the disengaging of the locking mechanisms for the support arm height and the support plate inclination can be accomplished by a single operation of the user's hand, without the need to actuate two or more knobs or other devices.

Figure 15:
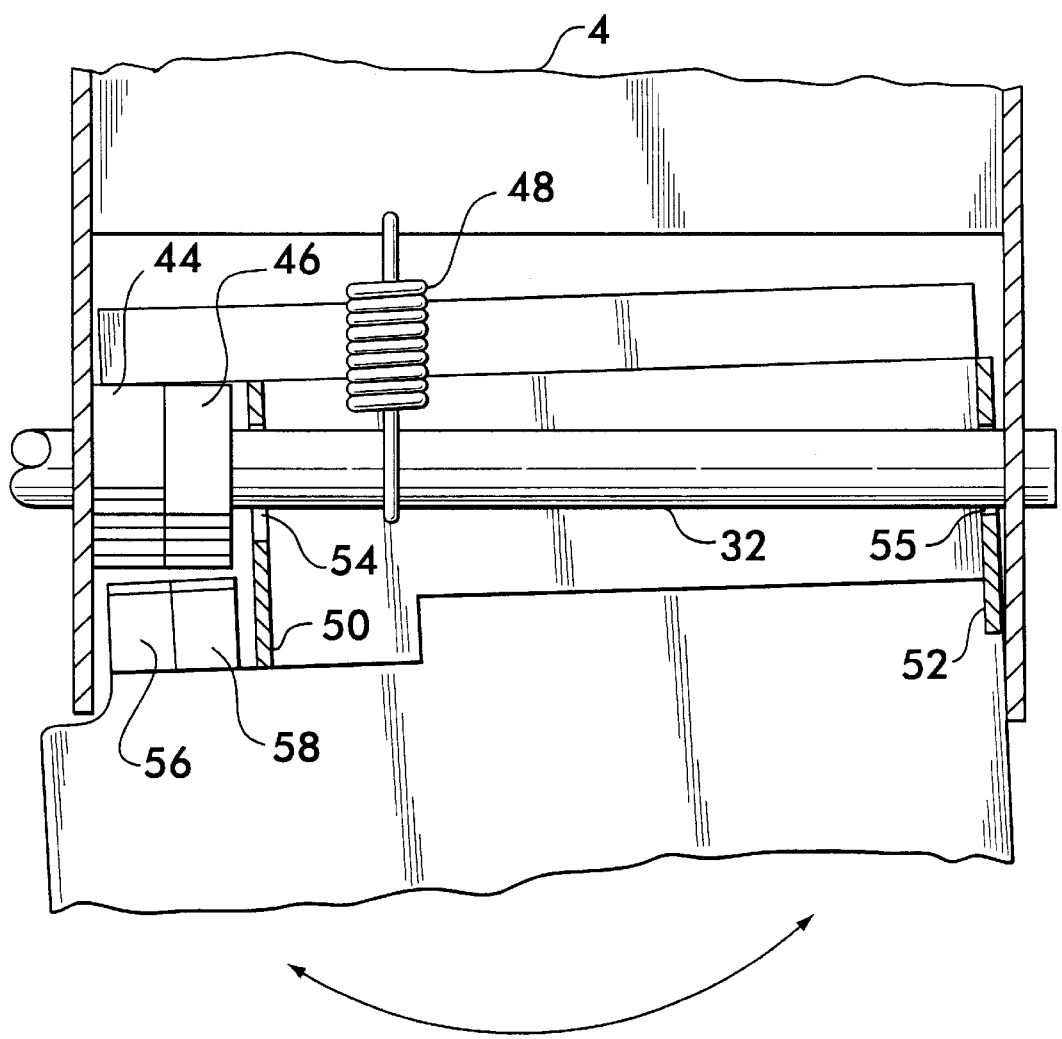

As shown best in FIGS. 14 and 15, the hole 54 in support plate flange 50 is elongated, while the hole 55 in flange 52 is not. This allows the support plate 14 to be rotated counterclockwise, when viewed from above, in a horizontal plane by pivoting flange 52 about shaft 32. Since both the height and inclination pawls 56 and 58 are fixed to the support plate 14, this rotation brings them out of engagement with height and inclination ratchets 44 and 46, as shown best in FIGS. 16 and 17. With the pawls disengaged, the user can reset both the height of the support arm and inclination of the support plate 14. Thus, the user can disengage both the height pawl 56 and the inclination pawl 58 essentially simultaneously by a single operation of the hand—specifically, by twisting the keyboard support 6 while it is being grasped. Thereafter, applying a slight force in the vertical direction, or a slight tilting motion to the keyboard support 6, places the keyboard support at the desired height and inclination. Once the desired height and inclination are obtained, the user can reengage the locking mechanisms by another single operation of the hand—specifically, by releasing the support 6, thereby allowing the tension spring 48 to automatically reengage both pawls to lock the support at the desired position.

Figure 21:
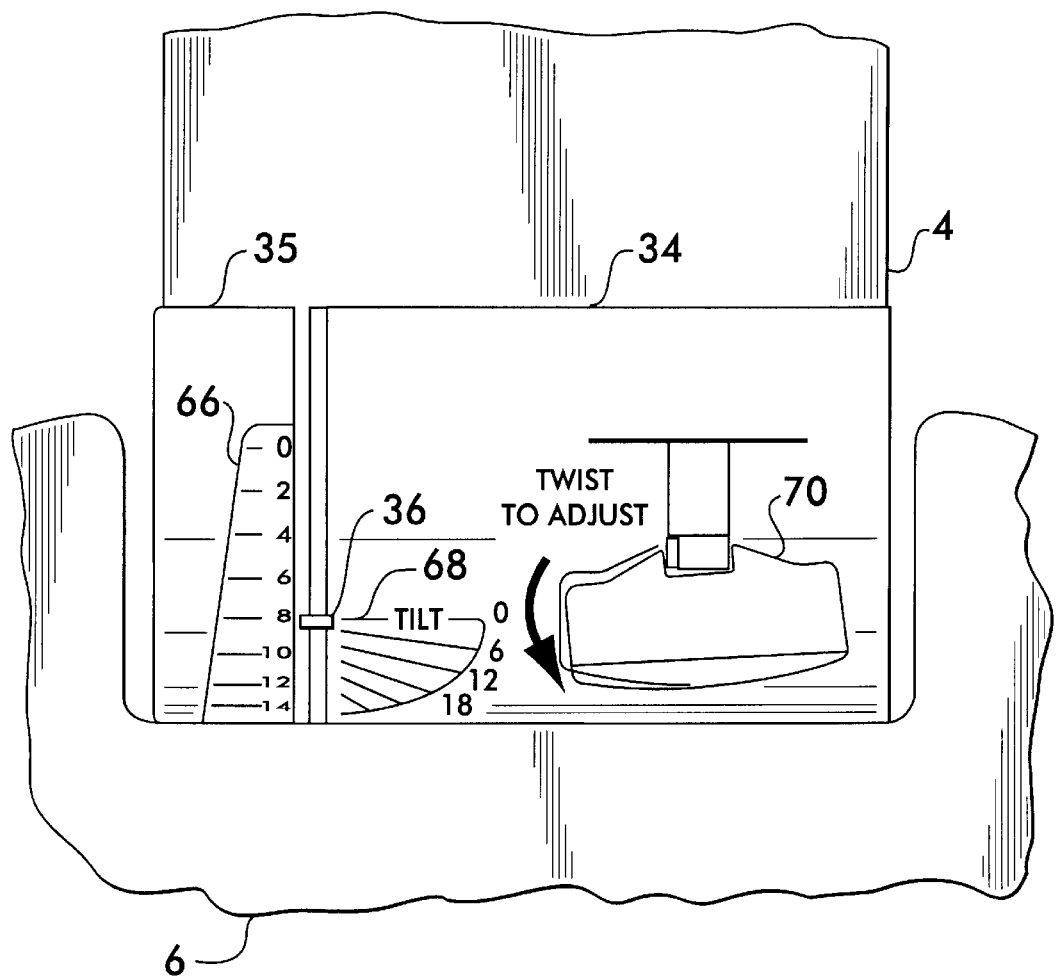
FIG. 21 is an end view of the front portion of the support apparatus shown in FIG. 1 with orientation graphics applied.

As shown best in FIG. 11, a pointer 36 is affixed to the bushing 60. As previously discussed, the bushing 60 is connected to the sprocket 30. Therefore, like the sprocket 30, the pointer 36 maintains a fixed angular orientation, while the support arm 4, as well as the support plate 14, rotate relative to the bushing 60. As shown in FIG. 21, graphical indicators 68 and 70 are applied to cover 34. Graphical indicator 70 instructs the user on the operation for disengaging the locking mechanism. Importantly, cover 34 is attached to and rotates with the support plate 14. Therefore, graphical indicator 68, in conjunction with the pointer 36, displays the angular inclination β of the support plate 14. Further, a graphical indicator 66 is applied to cover 35, which is attached to and rotates with the support arm 4. Therefore, graphical indicator 66, in conjunction with pointer 36, displays the angular orientation a of the support arm 4. Thus, if the user has predetermined inclinations associated with certain height adjustments, these can be readily duplication when the height it adjusted. Similarly, multiple users can each restore the apparatus to their individual preferred settings.

Figure 16:
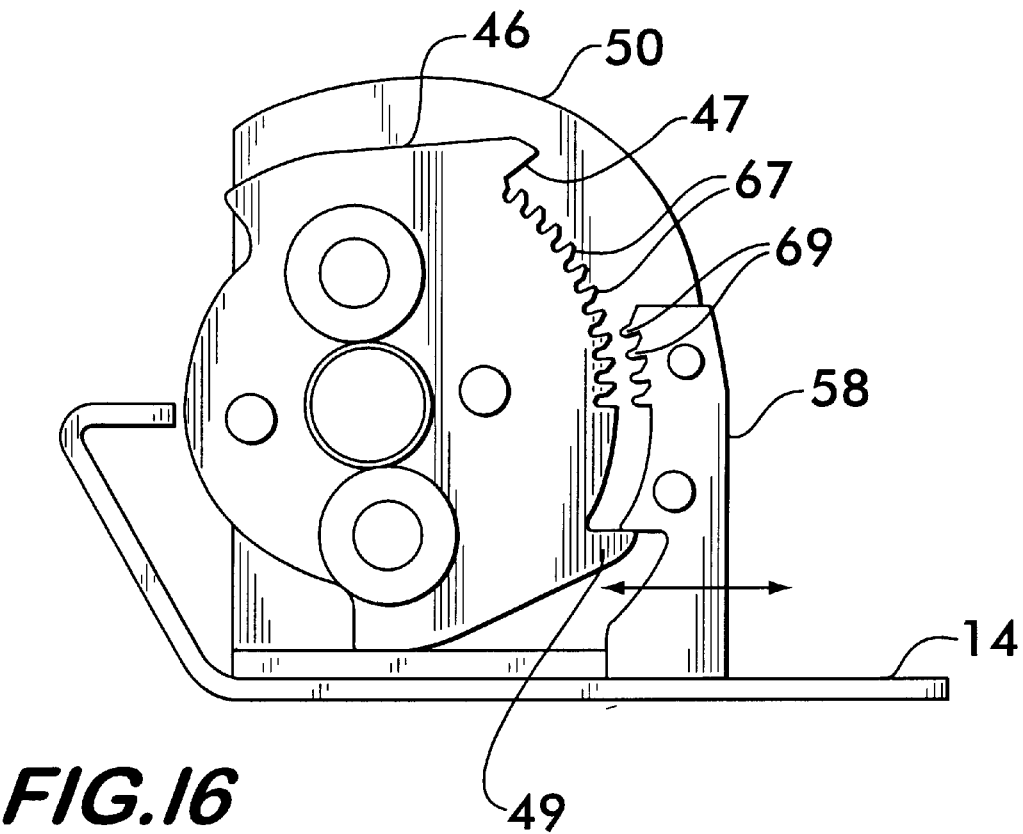
FIGS. 16 and 17 are detailed views showing the disengagement of the height and inclination locking mechanisms shown in FIGS. 14 and 15.
Figure 17:
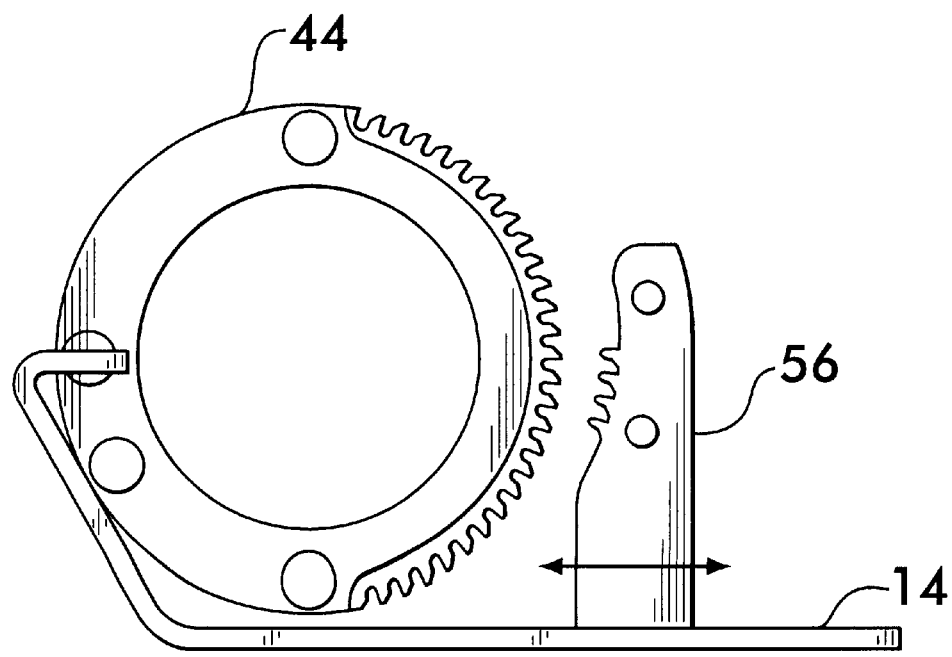

According to an important aspect of the invention, the apparatus will automatically maintain the support plate 14 at the horizontal orientation regardless of the height adjustment. As previously discussed, as a result of the interaction of the chain 38 and the sprockets 32 and 42, the rotational orientation of the inclination ratchet 46 remains fixed regardless of the angular orientation of the support arm. Moreover, as shown in FIG. 16, the lower stop 49 on the inclination ratchet 46 is sufficiently long to continue to engage the pawl 58 after it has been disengaged. Thus, by resting the pawl 58 against the lower stop 49 when the locking mechanisms are disengaged and the apparatus adjusted, the inclination of the support plate 14 can be maintained horizontal throughout the entire range of angular orientations of the support arm 4, as shown in FIGS. 20(a) and (b). Although, in the preferred embodiment, the lower stop 49 is set for horizontal inclination, the stop could be set to maintain any desired inclination constant during rotation of the support arm 4.

As discussed above, in order to lower the height of the support arm 4, or reduce the inclination of the support plate 14, the locking ratchets and pawls must be actively disengaged by the user. However, according to a further feature of the invention, when the user attempts to increase the height of the support arm 4 or increase the inclination of the support plate, the locking mechanisms will automatically disengage—that is, the user need not twist the support plate as shown in FIG. 15 to effect increases in height or inclination.

Figure 19:
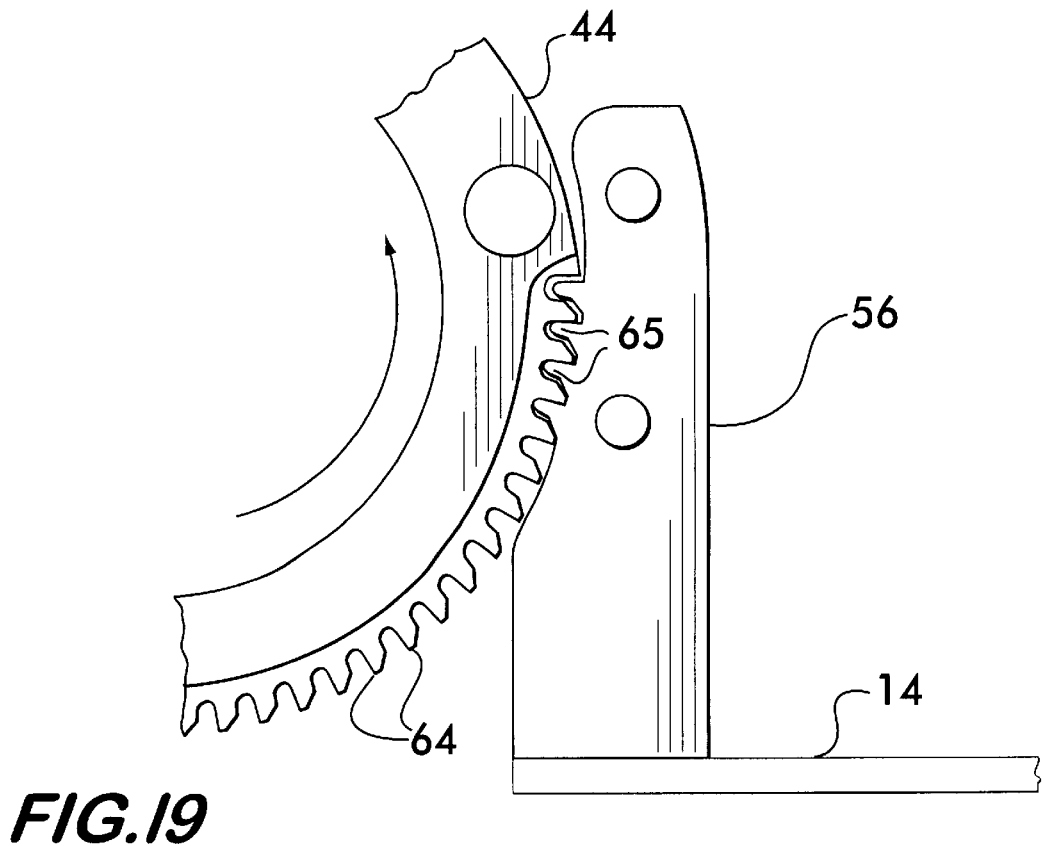
FIG. 19 a view of the engagement of the teeth of the height locking mechanism shown in FIG. 11.

As shown in FIG. 18, when the support arm 4 is rotated upward, the height ratchet 44 effectively rotates counterclockwise, when viewed as shown in FIG. 19, relative to the pawl 56. As shown in FIG. 19, the upper surfaces of the teeth 64 of the height ratchet 44 are sloped, while the lower surfaces of the teeth 65 of the height pawl 56 are also sloped. As shown in FIG. 20, increasing the inclination of the support plate 14 rotates the inclination pawl 58 counterclockwise relative to the inclination ratchet 46. As shown best in FIG. 16, the lower surfaces of the teeth 67 of the inclination ratchet 46 are sloped, while the upper surfaces of the teeth 69 of the inclination pawl 58 are also sloped.

The sloping of the surfaces of the teeth of the height ratchet 44 and pawl 56 described above allows the support arm 4 to be raised without disengaging the height pawl. When an upward force is applied to the support plate 14, the sloping tooth surfaces will drive the pawl 56 rearward, against the tension spring 48, and out of engagement with the ratchet 44, thereby allowing the support arm to be rotated upward. When the desired height is reached, and the upward rotation stops, the spring 48 will automatically re-engage the pawl 56.

Similarly, the sloping of the surfaces of the teeth of the inclination ratchet 46 and pawl 58 described above allows the inclination of the support plate 14 to be raised without disengaging the inclination pawl. When an upward rotation is applied to the support plate 14, the sloping tooth surfaces will drive the pawl 58 rearward, against the tension spring 48, and out of engagement with the ratchet 46, thereby allowing the support plate to rotate upward. When the desired inclination is reached, the spring 48 will automatically re-engage the pawl 56.

Although the present invention has been illustrated with reference to a keyboard support, the invention is equally applicable to other apparatus for supporting an object in a manner that provides for ready adjustment. Thus, the present invention may be embodied in other specific forms without departing from the spirit or essential attributes thereof and, accordingly, reference should be made to the appended claims, rather than to the foregoing specification, as indicating the scope of the invention.

What is claimed:

1. An adjustable support apparatus for supporting an object thereon that can be adjusted by a user, comprising:
   (a) a base;
   (b) a rotatable support arm coupled to said base, said support arm capable of being rotated over a range of angular orientations within a vertical plane, said range of angular orientations over which said support arm rotates comprises a first angular orientation that is above horizontal and a second angular orientation that is below horizontal;
   (c) a support member coupled to said support arm, said support member forming a support surface for supporting said object thereon, whereby said support member transmits a load onto said support arm that creates a first varying moment tending to rotate said support arm downward within said vertical plane, the magnitude of said first moment varying depending on the angular orientation into which said support arm is rotated and reaching a maximum value at a third angular orientation;
   (d) means for generating a substantially constant force;
   (e) means for transmitting said substantially constant force to said support arm so as to create a second varying moment tending to rotate said support arm upward, whereby said downward rotation of said support arm is at least partially resisted and upward rotation of said support arm is more easily effected by said user, the magnitude of said second moment varying depending on the angular orientation to which said support arm is rotated and reaching a maximum value when said support arm is at said first angular orientation, and
   (f) means for locking said angular orientation of said arm.

2. The adjustable support apparatus according to claim 1, wherein said locking means comprises first and second sprockets and a chain, said chain extending around said first and second sprockets, said first sprocket connected to said base and said second sprocket mounted to said support arm.

3. The adjustable support apparatus according to claim 1, wherein said means for generating said substantially constant force comprises a gas filled cylinder.

4. The adjustable support apparatus according to claim 2, wherein said locking means further comprises a ratchet and pawl.

5. An adjustable support apparatus for supporting an object thereon that can be adjusted by a user, comprising:

(a) a base;

(b) a rotatable support arm coupled to said base, said support arm capable of being rotated over a range of angular orientations within a vertical plane, said range of angular orientations over which said support arm rotates comprises a first angular orientation that is above horizontal and a second angular orientation that is below horizontal;

(c) a support member coupled to said support arm, said support member forming a support surface for supporting said object thereon, whereby said support member transmits a load onto said support arm that creates a first varying moment tending to rotate said support arm downward within said vertical plane, the magnitude of said first moment varying depending on the angular orientation into which said support arm is rotated and reaching a maximum value at a third angular orientation;

(d) a spring for generating a substantially constant force, said spring comprising an elongate spring member pre-stressed so as to be wound upon itself and having a first end, whereby extending said first end so as to unwind said spring member generates a force tending to retract said first end of said spring member, said rotation of said support arm over said range of angular orientations causing said spring member first end to undergo extensions over a range, said retraction force being substantially constant regardless of the amount by which said spring first end is extended within said range of extensions; and (e) means for transmitting said substantially constant force to said support arm so as to create a second varying moment tending to rotate said support arm upward, whereby said downward rotation of said support arm is at least partially resisted and upward rotation of said support arm is more easily effected by said user, the magnitude of said second moment varying depending on the angular orientation to which said support arm is rotated and reaching a maximum value when said support arm is at said first angular orientation.

6. The adjustable support apparatus according to claim 5, wherein said retraction force generated by said spring varies no more than about ±10% over said range of extensions of said spring first end.

7. The adjustable support apparatus according to claim 5, wherein said spring member is mounted on a rotatable core, said core connected to said base and said first end of said spring member is connected to said support arm, whereby said constant force generated by said spring is applied to said support arm.

8. The adjustable support apparatus according to claim 5, wherein said first end of said spring member is connected to a cam surface that is connected to said support arm.

9. The adjustable support apparatus according to claim 5, wherein said force transmitting means comprises a second arm connected to said support arm, said first end of said spring member coupled to said second arm.

10. The adjustable support apparatus according to claim 9, wherein said support arm and said second arm are mounted so as to rotate about a common axis.

11. The adjustable support apparatus according to claim 5, wherein said force transmitting means comprises:

(f) a second arm connected to said support arm, said constant force generated by said substantially constant force means applied to said second arm at an angle; and (g) means for varying said angle at which said constant force is applied to said second arm.

12. The adjustable support apparatus according to claim 11, wherein said means for varying said angle at which said constant force is applied comprises a pivot joint about which said second arm rotates.

13. The adjustable support apparatus according to claim 12, wherein said support arm extends from said pivot joint in a first direction and said second arm extends from said pivot joint in a second direction.

14. The adjustable support apparatus according to claim 11, wherein second arm has a surface formed thereon to which said substantially constant force is applied.

15. The adjustable support apparatus according to claim 14, wherein said surface is cylindrical.

16. The adjustable support apparatus according to claim 14, wherein said surface is not cylindrical.

17. The adjustable support apparatus according to claim 5, wherein the range of said angular orientations to which said support arm can be rotated causes the height of said support member to vary by more than 7 inches.

18. The adjustable support apparatus according to claim 5, further comprising means for attaching said base to a desk.

19. The adjustable support apparatus according to claim 5, wherein said support arm third angular orientation is approximately horizontal.

20. The adjustable support apparatus according to claim 5, wherein said support arm is at least about 11 inches long.

21. An adjustable support apparatus for supporting an object thereon that can be adjusted by a user, comprising:

(a) a base;

(b) a rotatable support arm coupled to said base, said support arm capable of being rotated over a range of angular orientations within a vertical plane, said range of angular orientations over which said support and rotates comprises a first angular orientation that is above horizontal and a second angular orientation that is below horizontal;

(c) a support member coupled to said support arm, said support member forming a support surface for supporting said object thereon, whereby said support member transmits a load onto said support arm that creates a first varying moment tending to rotate said support arm downward within said vertical plane, the magnitude of said first moment varying depending on the angular orientation into which said support arm is rotated and reaching a maximum value at a third angular orientation;

(d) means for generating a substantially constant force; and (e) means for transmitting said substantially constant force to said support arm so as to create a second varying moment tending to rotate said support arm upward, whereby said downward rotation of said support arm is at least partially resisted and upward rotation of said support arm is more easily effected by said user, the magnitude of said second moment varying depending on the angular orientation to which said support arm is rotated and reaching a maximum value when said support arm is at said first angular orientation; and (f) a chain extending from said base to said support arm, whereby said chain supports at least a portion of said load transmitted from said support member.

22. An adjustable support apparatus for supporting an object at a variety of heights and in a variety of inclinations, comprising:

(a) a base;
(b) a rotatable support arm coupled to said base, said support arm capable of being rotated into a plurality of first angular orientations;
(c) a first ratchet and pawl mechanism for locking said support arm into a first fixed angular orientation;
(d) a rotatable support member coupled to said support arm, said support member forming a surface thereon for supporting an object, said support member capable of being rotated into a plurality of second angular orientations independently of said angular orientation of said support arm, whereby rotation of said arm varies the height of said support surface and rotation of said support member varies the inclination of said support surface; and
(e) a second ratchet and pawl mechanism for locking said support member into a second fixed angular orientation.

23. The adjustable support apparatus according to claim 22, wherein said support member has means for supporting a keyboard thereon.

24. An adjustable support apparatus for supporting an object, comprising:
(a) a base;
(b) a rotatable support arm coupled to said base, said support arm capable of being rotated over a range of angular orientations;
(c) a support member coupled to said support arm, whereby said support member transmits a load onto said support arm that creates a first varying moment tending to rotate said support arm in a clockwise direction, the magnitude of said first moment varying depending on the angular orientation into which said support arm is rotated; and
(d) a spring comprising an elongate spring member prestressed so as to be wound around itself and having a first end, whereby extension of said first end so as to unwind said spring member generates an opposing force tending to retract said first end of said spring member, said spring connected to support arm so that said force generated by said spring creates a second moment tending to rotate said support arm in a counterclockwise direction, whereby said clockwise rotation of said support arm is at least partially resisted and counterclockwise rotation of the support arm is more easily effected by the user.

25. The adjustable support apparatus according to claim 24, wherein said rotation of said support arm over said range of angular orientations causes said spring member first end to undergo extensions over a range, said retraction force generated by said spring being substantially constant regardless of the amount by which said spring first end is extended within said range of extensions.

26. The adjustable support apparatus according to claim 25, wherein said retraction force generated by said spring varies no more than about ±10% over said range of extensions of said spring first end.

27. The adjustable support apparatus according to claim 24, further comprising second arm connecting said spring to said support arm, said second arm rotatably mounted so as to cause the magnitude of said second moment to vary depending on the angular orientation to which support arm is rotated, said second moment reaching a maximum value when said support arm is at approximately a horizontal angular orientation.

28. The adjustable support apparatus according to claim 24, wherein said first end of said spring member is at least partially wrapped around a surface connected to said support arm, whereby said force generated by said spring is applied to said surface.

29. The adjustable support apparatus according to claim 28, wherein said surface forms a cam.

30. The adjustable support apparatus according to claim 24, further comprising second arm connecting said spring to said support arm, said support arm and said second arm mounted so as to rotate about a common axis.

31. An adjustable support apparatus for supporting an object thereon, comprising:
(a) a base;
(b) a rotatable support arm coupled to said base, said support arm capable of being rotated over a range of angular orientations within a vertical plane, said range of angular orientations over which said support arm rotates comprises a first angular orientation that is above horizontal and a second angular orientation that is below horizontal, said support arm being subjected to a first varying moment tending to rotate said support arm downward within said vertical plane, the magnitude of said first moment varying depending on the angular orientation into which said support arm is rotated and reaching a maximum value at a third angular orientation;
(c) a support member coupled to said support arm, said support member forming a support surface for supporting said object thereon;
(d) means for generating a substantially constant force; and
(e) means for transmitting said substantially constant force to said support arm so as to create a second varying moment tending to rotate said support arm upward, the magnitude of said second moment varying depending on the angular orientation to which said support arm is rotated and being within at least ±25% of the magnitude of said first moment over at least a major portion of said range of angular orientations of said support arm.

32. The adjustable support apparatus according to claim 31, wherein the magnitude of said second moment created by said means for transmitting said substantially constant force is within at least ±10% of the magnitude of said first moment over substantially the entirety of said range of angular orientations of said support arm.

33. An adjustable support apparatus for supporting an object at a variety of heights and in a variety of inclinations, comprising:
(a) a base;
(b) a rotatable support arm coupled to said base, said support arm capable of being rotated into a plurality of first angular orientations;
(c) first locking means for locking said support arm into a first fixed angular orientation when said first locking means is engaged;
(d) a rotatable support member coupled to said support arm, said support member forming a surface thereon for supporting an object, said support member capable of being rotated in a plane into a plurality of second angular orientations independently of said angular orientation of said support arm, whereby rotation of said arm varies the height of said support surface and rotation of said support member varies the inclination of said support surface;
(e) second locking means for locking said support member into a second fixed angular orientation when said second locking means is engaged; and (f) means for essentially simultaneously disengaging said first and second locking means by no more than a single operation of the user's hand.

34. The adjustable support apparatus according to claim 33, further comprising means for essentially simultaneously engaging said first and second locking means by another single movement of the user's hand.

35. The adjustable support apparatus according to claim 33, wherein said simultaneous disengaging means comprises:
   (g) a first and second interengaging locking members for locking said support arm; and
   (h) third and fourth interengaging locking members for locking said support member, said first and third locking members mounted on said support arm, said second and fourth locking members mounted on said support member.

36. The adjustable support apparatus according to claim 35, wherein said simultaneous disengaging means comprises means for displacing said second and fourth locking members away from said first and third locking members.

37. The adjustable support apparatus according to claim 36, wherein said displacing means comprises means for rotating said support member in a second plane.

38. The adjustable support apparatus according to claim 37, wherein said second plane is perpendicular to said first plane.

39. The adjustable support apparatus according to claim 35, wherein said first and third locking members comprise first and second pawls, respectively, and wherein said second and fourth locking member comprise first and second ratchets, respectively.

40. The adjustable support apparatus according to claim 39, wherein said second ratchet is rotatably mounted on said support arm.

41. The adjustable support apparatus according to claim 40, wherein said first ratchet is fixedly mounted on said support arm.

42. The adjustable support apparatus according to claim 35, wherein said first locking member is rotatably mounted on said support arm, and wherein said first locking means comprises first and second sprockets and a chain, said chain extending around said first and second sprockets, said first sprocket connected to said base, said second sprocket rotatably mounted on said support arm.

43. The adjustable support apparatus according to claim 42, wherein said first locking member is connected to said second sprocket so as to prevent rotation of said second sprocket relative to said support arm when said first locking means is engaged.

44. An adjustable support apparatus for supporting an object at a variety of heights and in a variety of inclinations, comprising:
   (a) a base;
   (b) a rotatable support arm coupled to said base, said support arm capable of being rotated into a plurality of first angular orientations;
   (c) a rotatable support member having a surface formed thereon for supporting an object, said support member mounted for rotation on said support arm so as to be capable of rotating into a plurality of second angular orientations independently of said angular orientation of said support arm;
   (d) a first locking member connected to said support arm and having a surface adapted to engage a second locking member connected to said support member; and
   (e) a third locking member connected to said support arm and having a surface adapted to engage a fourth locking member connected to said support member, whereby displacement of said support member relative to said support arm disengages said second locking member from said first locking member and disengages said fourth third locking member from said third locking member.

45. The adjustable support apparatus according to claim 44, wherein said first locking member is fixedly connected to said support arm, and wherein said third locking member is rotatable connected to said support arm.

46. The adjustable support apparatus according to claim 45, wherein said support member is mounted for rotation about said support arm in two mutually perpendicular planes, and wherein rotation of said support arm in one of said planes results in said displacement of said support member relative to said support arm that disengages said second locking member from said first locking member and disengages said fourth third locking member from said third locking member.

47. An adjustable support apparatus for supporting an object at a variety of heights, comprising
   (a) a base;
   (b) a rotatable support arm coupled to said base, said support arm capable of being rotated into a plurality of angular orientations;
   (c) a support member rotatably mounted on said support arm, said support member forming a surface thereon for supporting an object;
   (d) locking means for locking said support arm into a first fixed angular orientation when said locking means is engaged; and
   (e) means for automatically disengaging said locking means when said support arm is rotated upward by the user and for automatically re-engaging said locking means when the user ceases further upward rotation of said support arm, said automatic disengaging and re-engaging means comprising first and second locking members each having teeth adapted to engage said teeth of the other locking member, said locking member teeth shaped to allow said first locking member to rotate relative to said second locking member in one direction but not in an opposite direction.

48. An adjustable support apparatus for supporting an object at a variety of heights, comprising:
   (a) a base;
   (b) a rotatable support arm coupled to said base, said support arm capable of being rotated into a plurality of angular orientations;
   (c) a support member rotatably mounted on said support arm, said support member forming a surface thereon for supporting an object;
   (d) means for maintaining the inclination of said support surface constant despite said rotation of said support arm through said plurality of angular orientations, said constant inclination maintaining means comprising:
      (i) a first sprocket connected to said base;
      (ii) a second sprocket mounted on said support arm; and
      (iii) a chain extending around said first and second sprockets.

49. The adjustable support apparatus according to claim 48, wherein said constant inclination maintaining means further comprises a stop connected to said second sprocket and forming a stop for maintaining said inclination of said support member constant.

50. An adjustable support apparatus for supporting an object, comprising:
(a) a base;
(b) a support arm coupled on said base so as to be capable of motion in a vertical direction;
(c) a support member coupled to said support arm for supporting said object, whereby said object transmits a load to said support member that urges said support arm downward;
(d) a spring mounted on said base, said spring comprising an elongate spring member pre-stressed so as to be wound around itself and having a first end, whereby extension of said first end so as to unwind said spring member generates an opposing force tending to retract said first end of said spring member, said spring first end connected to said support member so that said force generated by said spring creates a force tending to counterbalance said load, whereby downward movement of said support member is at least partially resisted and vertical movement of the support member is more easily effected by the user.

51. An adjustable support apparatus for supporting an object thereon, comprising:
(a) a base;
(b) a rotatable support arm coupled to said base, said support arm capable of being rotated over a range of angular orientations within a vertical plane;
(c) a support member rotatably coupled to said support arm so as to rotate over a range of angular orientations, said support member forming a support surface for supporting said object thereon, whereby said support member transmits a load onto said support arm;
(d) a chain extending from said base to said support arm so as to at least a portion of said load transmitted from said support member to said support arm.

52. The adjustable support apparatus according to claim 51, further comprising means for adjusting said angular orientation of said support member, said angular orientation adjusting means comprising means for adjusting the length of said chain.

53. The adjustable support apparatus according to claim 51, further comprising:
(e) first and second sprockets engaging said chain, said first sprocket fixed to said base, said second sprocket rotatably mounted on said support arm, whereby said second sprocket maintains a fixed angular orientation independent of said rotation of said support arm;
(f) a pointer coupled to said second sprocket so as to maintain a fixed angular orientation;
(g) a first graphical indicator attached to one of said support arm and said support member so as to cooperate with said pointer for indicating the angular orientation of at least one of said support arm and said support member.

54. The adjustable support apparatus according to claim 53, further comprising a second graphical indicator attached to the other of said support arm and said support member so as to cooperate with said pointer for indicating the angular orientation of the other of said support arm and said support member.

\* \* \* \* \*

UNITED STATES PATENT AND TRADEMARK OFFICE
CERTIFICATE OF CORRECTION

PATENT NO.     : 6,227,508 B1
DATED          : May 8, 2001
INVENTOR(S)    : Panzarella et al.

It is certified that error appears in the above-identified patent and that said Letters Patent is hereby corrected as shown below:

Title page,
Item [54], please delete, "ADJUSTABLE SUPPORT APPARATUS;" and insert therefor -- APPARATUS FOR PROVIDING AN ADJUSTABLE SUPPORT SURFACE, ESPECIALLY ADAPTED FOR SUPPORTING VISUAL MONITORS AND COMPUTER KEYBOARDS --;

Column 1,
Line 53, please delete "wight" and insert therefor -- weight --;

Column 3,
Line 45, please delete "present" and insert therefor -- current --;
Line 61, please delete "anisometric" and insert therefor -- isometric --;

Column 6,
Line 13, please delete "a" and insert therefor -- α --;
Line 47, please delete "a" and insert therefor -- α --;

Column 7,
Line 67, please insert a -- . -- after the word "horizontal";

Column 8,
Line 10, please delete "a" and insert therefor -- α --;

Column 14,
Line 34, please delete "and" and insert therefor -- arm --;

Signed and Sealed this

Thirtieth Day of July, 2002

Attest:

JAMES E. ROGAN
Attesting Officer          Director of the United States Patent and Trademark Office